United States Patent
Adhikary et al.

(10) Patent No.: US 8,989,131 B2
(45) Date of Patent: Mar. 24, 2015

(54) METHOD AND APPARATUS FOR SCHEDULING AND MU-MIMO TRANSMISSION BASED ON OUTDATED CHANNEL STATE INFORMATION AT THE TRANSMITTER

(75) Inventors: Ansuman Adhikary, Los Angeles, CA (US); Haralabos Papadopoulos, San Jose, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/236,611

(22) PCT Filed: Aug. 3, 2012

(86) PCT No.: PCT/US2012/049612
§ 371 (c)(1),
(2), (4) Date: Jan. 31, 2014

(87) PCT Pub. No.: WO2013/020095
PCT Pub. Date: Feb. 7, 2013

(65) Prior Publication Data
US 2014/0161091 A1    Jun. 12, 2014

Related U.S. Application Data

(60) Provisional application No. 61/514,838, filed on Aug. 3, 2011.

(51) Int. Cl.
*H04W 4/00* (2009.01)
*H04W 72/12* (2009.01)
(Continued)

(52) U.S. Cl.
CPC ......... *H04W 72/1226* (2013.01); *H04B 7/0452* (2013.01); *H04W 72/1231* (2013.01); *H04B 7/0626* (2013.01); *H04W 28/06* (2013.01)
USPC .......................................... 370/329; 375/267

(58) Field of Classification Search
USPC ................ 370/224, 252, 328, 329, 330, 448; 375/260, 267, 299, 347; 455/67.1, 455/63.1, 67.11, 509, 561, 277
See application file for complete search history.

(56) References Cited

U.S. PATENT DOCUMENTS

| | | | |
|---|---|---|---|
| 2008/0139153 A1* | 6/2008 | Tuo et al. | 455/277.2 |
| 2009/0067525 A1* | 3/2009 | Kim et al. | 375/260 |
| 2010/0266056 A1* | 10/2010 | Lee et al. | 375/260 |

FOREIGN PATENT DOCUMENTS

| | | |
|---|---|---|
| WO | 2007/008123 A1 | 1/2007 |
| WO | 2012/088142 A1 | 6/2012 |

OTHER PUBLICATIONS

Shirani-Mehr, H.; Caire, G.; Neely, M.J., "MIMO Downlink Scheduling with Non-Perfect Channel State Knowledge," Communications, IEEE Transactions on , vol. 58, No. 7, pp. 2055,2066, Jul. 2010.*

(Continued)

*Primary Examiner* — Edan Orgad
*Assistant Examiner* — Ivan O Latorre
(74) *Attorney, Agent, or Firm* — Blakely, Sokoloff, Taylor & Zafman LLP

(57) ABSTRACT

A method and apparatus is disclosed herein for scheduling and MU-MIMO transmission based on outdated channel state information. In one embodiment, the multi-user (MU)-MIMO wireless communication system has a multi-antenna transmitter and L user terminals, and the method comprises scheduling a pair of user packets for a round-2 transmission to form one MAT session using outdated channel state information at the transmitter (CSIT), including a first packet destined for a first user terminal and a second packet destined for a second user terminal, based on knowledge of user channels from transmissions to some or all L user terminals into and based on a utility function, combining eavesdropped observations from two of the plurality of round-1 transmissions, the eavesdropped observations including information indicative of round-1 eavesdropped channels feedback from the first and second user terminals, and transmitting the combined observations of the pair of user packets as part of the round-2 transmission.

16 Claims, 11 Drawing Sheets

(51) Int. Cl.
*H04B 7/04* (2006.01)
*H04B 7/06* (2006.01)
*H04W 28/06* (2009.01)

(56) References Cited

OTHER PUBLICATIONS

Cadambe, V.R.; Jafar, S.A., "Interference Alignment and Degrees of Freedom of the—User Interference Channel," Information Theory, IEEE Transactions on , vol. 54, No. 8, pp. 3425,3441, Aug. 2008.*

PCT/US2012/049612 Notification Concerning Transmittal of International Preliminary Report on Patentability, mailed Feb. 13, 2014, 9 pages.
International Search Report for PCT Application No. PCT/US2012/049612, filed Aug. 3, 2012, mailed Nov. 6, 2012, 4 pages.
Written Opinion of the International Searching Authority for PCT Application No. PCT/US2012/049612, filed Aug. 3, 2012, mailed Nov. 6, 2012, 9 pages.
Maddah-Ali et al., "Completely Stale Transmitter Channel State Information is Still Very Useful", Forty-Eighth Annual Allerton Conference, Allerton House, UIUC, Illinois, Sep. 29-Oct. 1, 2010, 8 pages.

* cited by examiner

MAT scheme with K=2 Users and R=2 Rounds
| | Round 1 TX | | Feedback | Round 2 TX |
|---|---|---|---|---|
| Time → | $t_1$ | $t_2$ | | $t_3$ |
| TX Signal | $u(t_1)=x_1$ | $u(t_2)=x_2$ | | $u(t_3)=v(h_2(t_1)x_1+h_1(t_2)x_2)$ |
| Signal at RX1 | $z_1(t_1)=h_1(t_1)x_1$ | $z_1(t_2)=h_1(t_2)x_2$ | | $z_1(t_3)=h_1(t_3)u(t_3)$ |
| Signal at RX2 | $z_2(t_1)=h_2(t_1)x_1$ | $z_2(t_2)=h_2(t_2)x_2$ | | $z_2(t_3)=h_2(t_3)u(t_3)$ |
| Feedback | | | $h_2(t_1)$, $h_1(t_2)$ | |
| CSIT | None | None | | $h_2(t_1)$, $h_1(t_2)$ [$h_1(t_3)$, $h_2(t_3)$ are not known] |
FIG. 1
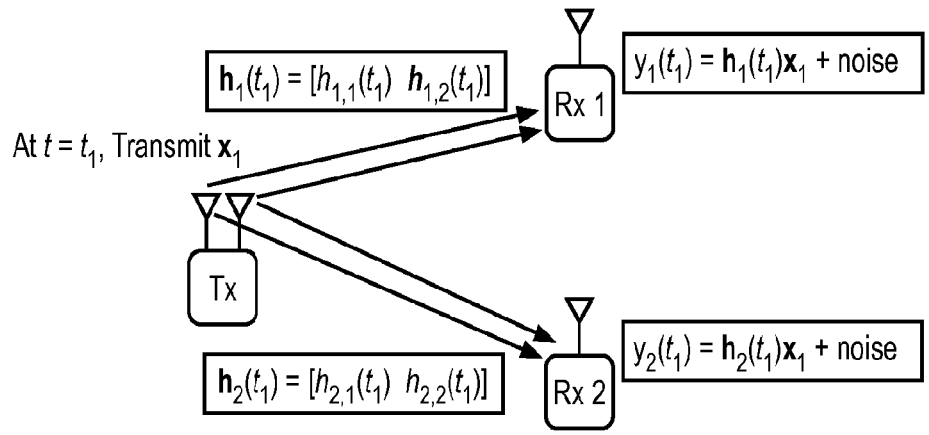
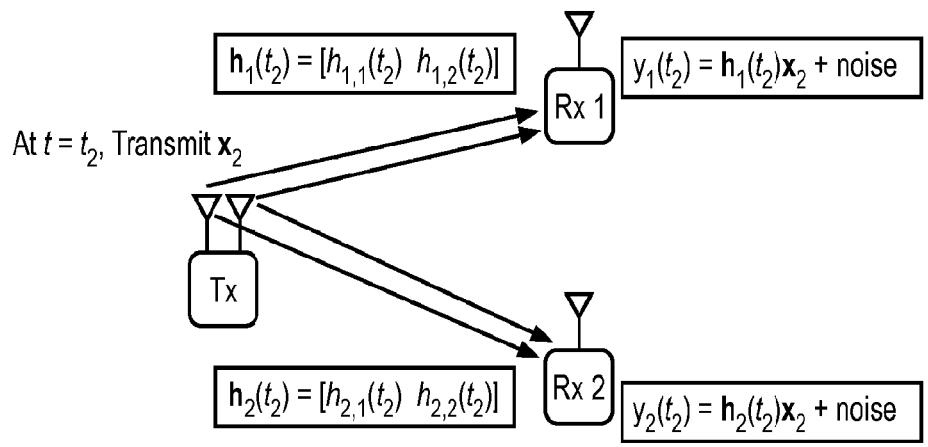
FIG. 2

Base scheme with K=3 Users and R=2 Rounds

| | Round 1 TX | | | Feedback |
|---|---|---|---|---|
| Time → | $t_1$ | $t_2$ | $t_3$ | |
| TX Signal | $u(t_1)=x_1$ | $u(t_2)=x_2$ | $u(t_3)=x_3$ | |
| Signal at RX1 | $z_1(t_1)=h_1(t_1)x_1$ | $z_1(t_2)=h_1(t_2)x_2$ | $z_1(t_3)=h_1(t_3)x_3$ | |
| Signal at RX2 | $z_2(t_1)=h_2(t_1)x_1$ | $z_2(t_2)=h_2(t_2)x_2$ | $z_2(t_3)=h_2(t_3)x_3$ | |
| Signal at RX3 | $z_3(t_1)=h_3(t_1)x_1$ | $z_3(t_2)=h_3(t_2)x_2$ | $z_3(t_3)=h_3(t_3)x_3$ | |
| Feedback | | | | $h_i(t_k); i, k = 1,2,3$ |
| CSIT | None | None | None | |
| | Round 2 TX | | | |
| | At TX: set $x_{m,n}=z_m(t_n)+z_n(t_m)$, for $1 \leq m, n \leq 3$ | | | |
| Time → | $t_4$ | $t_5$ | $t_6$ | |
| TX Signal | $u(t_4)=v\, x_{1,2}$ | $u(t_5)=v\, x_{1,3}$ | $u(t_6)=v\, x_{2,3}$ | |
| Signal at RX1 | $z_1(t_4)=h_1(t_4)\, u(t_4)$ | $z_1(t_5)=h_1(t_5)\, u(t_5)$ | $z_1(t_6)=h_1(t_6)\, u(t_6)$ | |
| Signal at RX2 | $z_2(t_4)=h_2(t_4)\, u(t_4)$ | $z_2(t_5)=h_2(t_5)\, u(t_5)$ | $z_2(t_6)=h_2(t_6)\, u(t_6)$ | |
| Signal at RX3 | $z_3(t_4)=h_3(t_4)\, u(t_4)$ | $z_3(t_5)=h_3(t_5)\, u(t_5)$ | $z_3(t_6)=h_3(t_6)\, u(t_6)$ | |
| Feedback | | | | |
| CSIT | $h_i(t_1), h_i(t_2), h_i(t_3)$ for $i=1,2,3$ are available<br>[$h_i(t_4), h_i(t_5), h_i(t_6)$ for $i=1,2,3$ are not known] | | | |

FIG. 5

Base scheme with K=3 Users and R=3 Rounds

| | Round 1 TX | | | Feedback |
|---|---|---|---|---|
| Time → | $t_1$ | $t_2$ | $t_3$ | |
| TX Signal | $k=1,2: u_k(t_1)=V_1(k)x_1$ | $k=1,2: u_k(t_2)=V_1(k)x_2$ | $k=1,2: u_k(t_3)=V_1(k)x_3$ | |
| Signal at RX1 | $z_1(t_1,k)=h_1(t_1)\, u_k(t_1)$ | $z_1(t_2,k)=h_1(t_2)\, u_k(t_2)$ | $z_1(t_3,k)=h_1(t_3)\, u_k(t_3)$ | |
| Signal at RX2 | $z_2(t_1,k)=h_2(t_1)\, u_k(t_1)$ | $z_2(t_2,k)=h_2(t_2)\, u_k(t_2)$ | $z_2(t_3,k)=h_2(t_3)\, u_k(t_3)$ | |
| Signal at RX3 | $z_3(t_1,k)=h_3(t_1)\, u_k(t_1)$ | $z_3(t_2,k)=h_3(t_2)\, u_k(t_2)$ | $z_3(t_3,k)=h_3(t_3)\, u_k(t_3)$ | |
| Feedback | | | | $h_i(t_k), 1 \leq i,k \leq 3$ |
| CSIT | None | | | |
| | Round 2 TX | | | |
| | At TX: set $z_m(t_k)=[z_m(t_k,1)\ z_m(t_k,2)]^T$, $x_{m,n}=z_m(t_n)+z_n(t_m)$, for $1 \leq m, n, k \leq 3$ | | | |
| Time → | $t_4$ | $t_5$ | $t_6$ | |
| TX Signal | $u(t_4)=V_2\, x_{1,2}$ | $u(t_5)=V_2\, x_{1,3}$ | $u(t_6)=V_2\, x_{2,3}$ | |
| Signal at RX1 | $z_1(t_4)=h_1(t_4)\, u(t_4)$ | $z_1(t_5)=h_1(t_5)\, u(t_5)$ | $z_1(t_6)=h_1(t_6)\, u(t_6)$ | |
| Signal at RX2 | $z_2(t_4)=h_2(t_4)\, u(t_4)$ | $z_2(t_5)=h_2(t_5)\, u(t_5)$ | $z_2(t_6)=h_2(t_6)\, u(t_6)$ | |
| Signal at RX3 | $z_3(t_4)=h_3(t_4)\, u(t_4)$ | $z_3(t_5)=h_3(t_5)\, u(t_5)$ | $z_3(t_6)=h_3(t_6)\, u(t_6)$ | |
| Feedback | | | | |
| CSIT | $h_i(t_k)$, $i=1,2,3$, and only for $k=1,2,3$ | | | |
| | Feedback | Round 3 TX | | |
| | | At TX: set $x_{1,2,3}=[z_3(t_4)\ z_2(t_5)\ z_1(t_6)]^T$ | | |
| Time → | | $t_7$ | | |
| TX Signal | | For $k=1,2$: $u(t_7,k) = V_3(k)\, x_{1,2,3}$ | | |
| Signal at RX1 | | $z_1(t_7,k)=h_1(t_7)\, u(t_7,k)$ | | |
| Signal at RX2 | | $z_2(t_7,k)=h_2(t_7)\, u(t_7,k)$ | | |
| Signal at RX3 | | $z_3(t_7,k)=h_3(t_7)\, u(t_7,k)$ | | |
| Feedback | $h_i(t_k), 1 \leq i \leq 3, 1 \leq k \leq 6$ | | | |
| CSIT | | $h_i(t_k), 1 \leq i \leq 3, 1 \leq k \leq 6$ [the $h_i(t_7)$'s are not known] | | |

FIG. 6

Scheduling with L Users and R=2 Rounds

| | Round 1 TX |
|---|---|
| | Scheduler transmits i-th packet for m-th user at time t=$t_m(i)$ |
| Time → | $t_m(i)$ |
| TX Signal | $u(t_m(i)) = x_m(i)$ |
| Signal at $RX_1$ | $z_1(t_m(i)) = h_1(t_m(i)) \, x_m(i)$ |
| Signal at $RX_2$ | $z_2(t_m(i)) = h_2(t_m(i)) \, x_m(i)$ |
| ⋮ | ⋮ |
| Signal at $RX_k$ | $z_k(t_m(i)) = h_k(t_m(i)) \, x_m(i)$ |
| ⋮ | ⋮ |
| Signal at $RX_L$ | $z_L(t_m(i)) = h_L(t_m(i)) \, x_m(i)$ |
| CSIT | None |
| | Round 2 TX |
| | Scheduler pairs $x_m(i)$ with $x_n(j)$ for some m, n, i, j:<br>It then forms: $x_{m,n}(i,j) = z_n(t_m(i)) + z_m(t_n(j))$, for $1 \leq m, n \leq L$<br>It then schedules it for transmission at some time t=$t_{m,n}(i,j)$ |
| Time → | $t_{m,n}(i,j)$ |
| TX Signal | $u(t_{m,n}(i,j)) = v \, x_{m,n}(i,j)$ |
| Signal at $RX_1$ | $z_1(t_{m,n}(i,j)) = h_1(t_{m,n}(i,j)) \, u(t_{m,n}(i,j))$ |
| Signal at $RX_2$ | $z_2(t_{m,n}(i,j)) = h_2(t_{m,n}(i,j)) \, u(t_{m,n}(i,j))$ |
| ⋮ | ⋮ |
| Signal at $RX_k$ | $z_k(t_{m,n}(i,j)) = h_k(t_{m,n}(i,j)) \, u(t_{m,n}(i,j))$ |
| ⋮ | ⋮ |
| Signal at $RX_L$ | $z_L(t_{m,n}(i,j)) = h_L(t_{m,n}(i,j)) \, u(t_{m,n}(i,j))$ |
| CSIT | $h_n(t_m(i))$ and $h_m(t_n(j))$ are available<br>[the $h_k(t_{m,n}(i,j))$'s are not known] |

User m Buffer
(Based on Round-1 CSIT)
[$N_m$=4 candidate packets for pairing]

$801_m$, $802_m$, $803_m$, $804_m$

| | | | | |
|---|---|---|---|---|
| Packet Index | $i_1$ | $i_2$ | $i_3$ | $i_4$ |
| Round-1 TX time | $t_m(i_1)$ | $t_m(i_2)$ | $t_m(i_3)$ | $t_m(i_4)$ |
| Packet | $x_m(i_1)$ | $x_m(i_2)$ | $x_m(i_3)$ | $x_m(4)$ |
| User 1 channel | $h_1(t_m(i_1))$ | $h_1(t_m(i_2))$ | $h_1(t_m(i_3))$ | $h_1(t_m(i_4))$ |
| User 2 channel | $h_2(t_m(i_1))$ | $h_2(t_m(i_2))$ | $h_2(t_m(i_3))$ | $h_2(t_m(i_4))$ |
| ⋮ | ⋮ | ⋮ | ⋮ | ⋮ |
| User n channel | $h_n(t_m(i_1))$ | $h_n(t_m(i_2))$ | $h_n(t_m(i_3))$ | $h_n(t_m(i_4))$ |
| ⋮ | ⋮ | ⋮ | ⋮ | ⋮ |
| User L channel | $h_L(t_m(i_1))$ | $h_L(t_m(i_2))$ | $h_L(t_m(i_3))$ | $h_M(t_m(i_4))$ |

FIG. 8

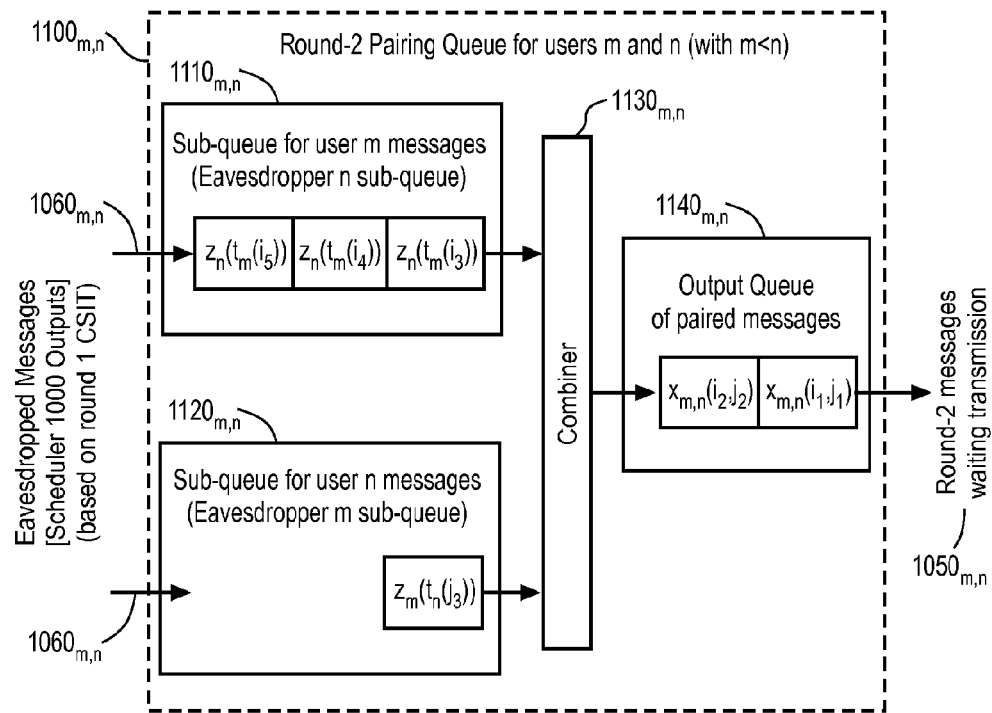

FIG. 11

Typical MAT scheduling session with K=3 Users and R=2 Rounds

| Messages carrying → | Packet 6 for user 1 | Packet 13 for user 2 | Packet 27 for user 3 |
|---|---|---|---|
| Round 1 Messages | $x_1(6)$ | $x_2(13)$ | $x_3(27)$ |
| Round 2 Messages | $x_{1,2}(6,13)$ | $x_{1,2}(6,13)$ | $x_{1,3}(6,27)$ |
| | $x_{1,3}(6,27)$ | $x_{2,3}(13,27)$ | $x_{2,3}(13,27)$ |

Typical Packet-centric scheduling session with K=3 Users and R=2 Rounds

| Messages carrying → | Packet 6 for user 1 | Packet 13 for user 2 | Packet 27 for user 3 |
|---|---|---|---|
| Round 1 Messages | $x_1(6)$ | $x_2(13)$ | $x_3(27)$ |
| Round 2 Messages | $x_{1,2}(6,13)$ | $x_{1,2}(6,13)$ | $x_{1,3}(6,27)$ |
| | $x_{1,3}(6,27)$ | $x_{2,4}(13,9)$ | $x_{3,5}(27,4)$ |

FIG. 12

Scheduling with $L$ Users and $R=3$ Rounds

| | Round 1 TX |
|---|---|
| | TX transmits k-th linear comb. of i-th packet for m-th user at time $t=t_m(n,k)$ |
| Time → | $t_m(i,k)$, for $k=1, 2, K-1$ |
| TX Signal | $u(t_m(i,k)) = \mathbf{V}_1(k)\, \mathbf{x}_m(i)$ |
| Signal at RX$_1$ | $z_1(t_m(i,k)) = \mathbf{h}_1(t_m(i,k))\, u(t_m(i,k))$ |
| Signal at RX$_2$ | $z_2(t_m(i,k)) = \mathbf{h}_2(t_m(i,k))\, u(t_m(i,k))$ |
| ⋮ | ⋮ |
| Signal at RX$_L$ | $z_L(t_m(i,k)) = \mathbf{h}_L(t_m(i,k))\, u(t_m(i,k))$ |
| CSIT | None |
| | Round 2 TX |
| | Scheduler pairs $\mathbf{x}_m(i)$ with $\mathbf{x}_n(j)$ for some $m, n, i, j$: It then forms: $\mathbf{x}_{m,n}(i,j) = \mathbf{z}_n(t_m(i)) + \mathbf{z}_m(t_n(j))$, where $\mathbf{z}_n(t_m(i)) = [z_n(t_m(i,1))\, z_n(t_m(i,2)) \ldots z_n(t_m(i,K-1))]^T$ It then schedules it for transmission at some time $t = t_{m,n}(i,j)$ |
| Time → | $t_{m,n}(i,j)$ |
| TX Signal | $u(t_{m,n}(i,j)) = \mathbf{V}_2\, \mathbf{x}_{m,n}(i,j)$ |
| Signal at RX$_1$ | $z_1(t_{m,n}(i,j)) = \mathbf{h}_1(t_{m,n}(i,j))\, u(t_{m,n}(i,j))$ |
| Signal at RX$_2$ | $z_k(t_{m,n}(i,j)) = \mathbf{h}_k(t_{m,n}(i,j))\, u(t_{m,n}(i,j))$ |
| ⋮ | ⋮ |
| Signal at RX$_L$ | $z_L(t_{m,n}(i,j)) = \mathbf{h}_L(t_{m,n}(i,j))\, u(t_{m,n}(i,j))$ |
| CSIT | $\mathbf{h}_n(t_m(i))$ and $\mathbf{h}_m(t_n(j))$ are available [the $\mathbf{h}_k(t_{m,n}(i,j))$'s are not known] |
| | Round 3 TX |
| | Scheduler pairs $\mathbf{x}_{m,n}(i,j)$ $\mathbf{x}_{m,q}(i',l)$ and $\mathbf{x}_{n,q}(j',l')$, for triplet of distinct users $m, n,$ and $q$, and for some $i, i', j, j', l, l'$: It then forms: $\mathbf{x}_{m,n,q}(i,i',j,j',l,l') = [z_q(t_{m,n}(i,j))\, z_n(t_{m,q}(i',l))\, z_m(t_{n,q}(j',l'))]^T$ It schedules it for TXs at $\tau_1 = t_{m,n,q}(i,i',j,j',l,l';1)$ and $\tau_2 = t_{m,n,q}(i,i',j,j',l,l';2)$ |
| Time → | $\tau_k = t_{m,n,q}(i,i',j,j',l,l';k)$, $k=1,2$ |
| TX Signal | $u(\tau_k) = \mathbf{V}_3(k)\, \mathbf{x}_{m,n,q}(i,i',j,j',l,l')$ |
| Signal at RX$_1$ | $z_1(\tau_k) = \mathbf{h}_1(\tau_k)\, u(\tau_k)$ |
| Signal at RX$_2$ | $z_2(\tau_k) = \mathbf{h}_2(\tau_k)\, u(\tau_k)$ |
| ⋮ | ⋮ |
| Signal at RX$_L$ | $z_L(\tau_k) = \mathbf{h}_L(\tau_k)\, u(\tau_k)$ |
| CSIT | $\mathbf{h}_n(t_m(i))$ and $\mathbf{h}_m(t_n(j))$ are available [the $\mathbf{h}_n(\tau_k)$'s are not known] |

FIG. 14

Typical MAT scheduling session with K=3 Users and R=3 Rounds

| Messages carrying → | Packet 6 for user 1 | Packet 13 for user 2 | Packet 27 for user 3 |
|---|---|---|---|
| Round 1 Messages (2 transmissions) | $x_1(6)$ | $x_2(13)$ | $x_3(27)$ |
| Round 2 Messages | $x_{1,2}(6,13)$ | $x_{1,2}(6,13)$ | $x_{1,3}(6,27)$ |
| | $x_{1,3}(6,27)$ | $x_{2,3}(13,27)$ | $x_{2,3}(13,27)$ |
| Round 3 Messages (2 transmissions) | $x_{1,2,3}(6,13,27)$ | $x_{1,2,3}(6,13,27)$ | $x_{1,2,3}(6,13,27)$ |

Typical Packet-centric scheduling session with K=3 Users and R=3 Rounds

| Messages carrying → | Packet 6 for user 1 | Packet 13 for user 2 | Packet 27 for user 3 |
|---|---|---|---|
| Round 1 Messages (2 transmissions) | $x_1(6)$ | $x_2(13)$ | $x_3(27)$ |
| Round 2 Messages | $x_{1,2}(6,13)$ | $x_{1,2}(6,13)$ | $x_{1,3}(6,27)$ |
| | $x_{1,3}(6,27)$ | $x_{2,4}(13,9)$ | $x_{3,5}(27,4)$ |
| Round 3 Messages (2 transmissions each) | $x_{1,2,7}(6,10,13,28,9,45)$ | $x_{1,2,7}(6,10,13,28,9,45)$ | $x_{1,3,6}(6,3,27,8,2,15)$ |
| | $x_{1,3,6}(6,3,27,8,2,15)$ | $x_{2,4,9}(13,2,9,15,63,8)$ | $x_{3,5,11}(27,9,4,41,82,33)$ |

FIG. 17

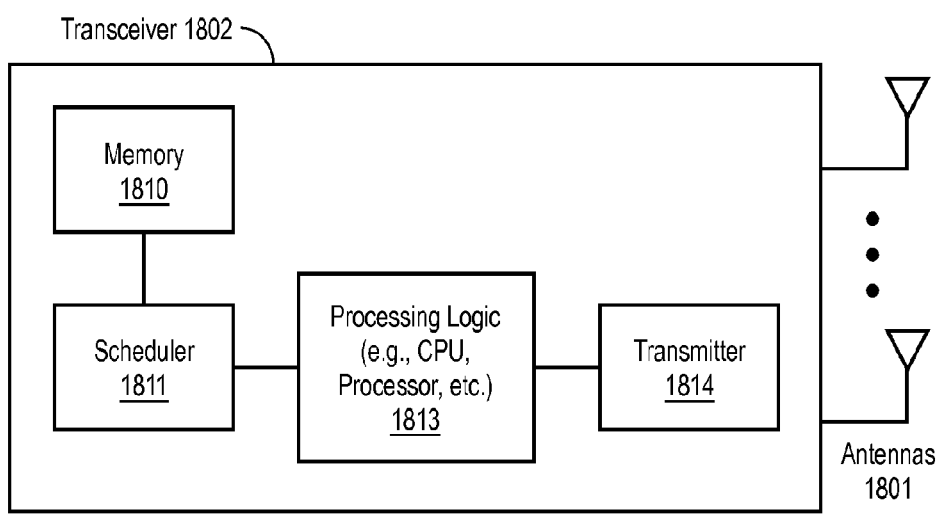

FIG. 18

METHOD AND APPARATUS FOR SCHEDULING AND MU-MIMO TRANSMISSION BASED ON OUTDATED CHANNEL STATE INFORMATION AT THE TRANSMITTER

PRIORITY

The present patent application is a U.S. National Phase Application under 35 U.S.C. §371 of International Application No. PCT/US2012/049612, filed Aug. 3, 2012, entitled A METHOD AND APPARATUS FOR SCHEDULING AND MU-MIMO TRANSMISSION BASED ON OUTDATED CHANNEL STATE INFORMATION AT THE TRANSMITTER, which claims priority to and incorporates by reference the corresponding provisional patent application Ser. No. 61/514,838, titled, "A Method and Apparatus for Efficient Scheduling and MU-MIMO Transmission based on Outdated Channel State Information at the Transmitter," filed on Aug. 3, 2011.

FIELD OF THE INVENTION

Embodiments of the present invention relate to the field of multiuser Multiple Input Multiple Output (MIMO) wireless transmission systems; more particularly, embodiments of the present invention relate to a new class of Multiuser-MIMO (MU-MIMO) techniques that exploit completely outdated channel state information at the transmitter (CSIT).

BACKGROUND OF THE INVENTION

Many recent advances in wireless transmission have rested on the use of multiple antennas for transmission and reception. Multiple antennas, fundamentally, can provide an increase in the numbers of Degrees of Freedom (DoFs) that can be exploited by a wireless system for transmission, i.e., the number of scalar data streams that can be simultaneously transmitted to the receiving parties in the system. Here, DoFs can be used to provide increased spectral efficiency (throughput) and/or added diversity (robustness). Indeed, a Single User MIMO (SU-MIMO) system with $N_T$ transmission antennas serving a single user with $N_R$ receive antennas may be able to exploit up to $\min(N_T, N_R)$ DoFs for downlink transmission. These DoFs, can under certain conditions be used to improve throughput by a factor that grows linearly with $\min(N_T, N_R)$. Such benefits of MIMO, and increased DoFs, are behind much of the interest in using MIMO in new and future systems.

Exploiting such DoFs often requires some amount of cost to the system. One such cost is knowledge of the channel state between transmitting and receiving antennas. Such Channel State Information (CSI) often has to be available to either the transmitter (such CSI is termed CSIT) and/or to the receiver (such CSI is termed CSIR). The DoFs available also depend on having sufficient "richness" in the channels between transmitting and receiving antennas.

For example, SU-MIMO CSIR-based systems such as Bit Interleaved Coded Modulation (BICM) and D-BLAST can achieve the maximum possible DoFs of $\min(N_T, N_R)$ under suitable channel conditions. Under such conditions, they therefore can be used to provide corresponding linear increases in spectral efficiency. Such designs are well understood by those familiar with the state of the art.

Similarly, a Multi-User MIMO (MU-MIMO) system with $N_T$ transmission antennas at the base station (BS) and K single-antenna users ($N_R=1$) can provide up to $\min(N_T, K)$ DoFs. As in the case of SU-MIMO, MU-MIMO can be used to improve throughput linearly with $\min(N_T, K)$.

However, unlike SU-MIMO, many MU-MIMO techniques (in fact most if not all of the prevailing MU-MIMO techniques used and studied for standards) require knowledge of CSIT. MU-MIMO based on CSIT, unlike SU-MIMO based on CSIR, requires additional overheads to estimate CSI and feedback CSI to transmitters before the transmission can even take place (see Caire et al., "Multiuser MIMO achievable rates with downlink training and channel state," in IEEE Transactions on Information Theory, June 2010, pp. 2845-2866).

Despite such overheads, MU-MIMO is of practical interest since it has the benefit over SU-MIMO of being able to grow the DoFs without having to add many receive antennas, radio frequency (RF) chains, or increase processing (e.g., decoding) complexity to portable or mobile devices.

The issue of CSI overhead is a fundamental issue that should not be overlooked in assessing such conventional MIMO. Such CSI-related overhead in fact can represent a fundamental "dimensionality bottleneck" that can limit the net spectral efficiency increase that can be obtained with conventional CSI-dependent MIMO.

In particular, if one wants to continue to exploit the growth in DoFs (e.g., linear growth) by increasing $N_T$ (or $N_R$ or K), one also has to consider how to support increased system overhead in obtaining the CSI required to formulate transmissions and decode at the receivers. Such overhead can include increased use of the wireless medium for pilots supporting CSI estimation and increased feedback between receiving and transmitting entities on such CSI estimates.

As an example, assume that for each complex scalar value that defines the CSI between a single TX antenna and a single RX antenna (this type of CSI is often termed direct CSI by some in the Standards community) a fixed percentage $F_{csi}$ of wireless-channel resources is dedicated to pilots and/or feedback. One can easily see that as the dimension of the CSI required scales with quantities like $N_T$, $N_R$ and/or K, the total CSI system-related overhead grows (e.g., by $N_T \times F_{csi}$). For example, for K single antenna users, each with $N_T$ CSI scalar terms with respect to the transmitting antenna, there are KNT such scalars. Supporting an increase in the dimension of the CSI can take more wireless-channel resources, and reduces the amount of resources left for data transmission. This overhead increase can limit continued growth in throughput if spectral efficiency improvements do not offset increased CSI overheads.

The value $F_{csi}$ is often defined either by the system or by necessity given the coherence of channels in time and/or frequency. As the state of channels changes more rapidly in time and/or frequency, more resources may need to be used to estimate and keep track of CSI.

As an example, in a Frequency Division Duplex (FDD) based 3GPP Long Term Evolution (LTE) design, 8 symbols in a resource block of 12×14 OFDM symbols are used to support downlink pilots for each of the NT antennas. Simply considering system overheads for such pilots, and ignoring other CSI related overheads such as feedback, $F_{csi}$ can be as large as 8/168=4.76%. It means that with NT=8, assuming the pilot structure scales linearly with additional antennas, the total CSI-overhead could be as large as 38%, leaving 62% of symbols for supporting the remaining signaling overheads and data transmission. Clearly, such a system would not support unbounded increases in NT.

Thus, although symbols representing coded data information are used more efficiently, with increased robustness and/or spectral efficiency due to the increased DoFs by MIMO, the net spectral efficiency increases have to account for the CSI overhead. Thus, the net spectral efficiency growth is in fact less than that of individual data symbols as only a fraction of no more than $(1-N_T \times F_{csi})$ of symbols can be used for data.

Recently a new class of techniques, termed "Blind Interference Alignment" (BIA) techniques, has demonstrated the ability to grow DoFs without requiring many of the CSI overheads of conventional MU-MIMO systems (see Wang et al., "Aiming Perfectly in the Dark—Blind Interference Alignment through Staggered Antenna Switching," at http://arvix-.org/abs/1002.2720). It is possible for a Multi-User MIMO (MU-MIMO) system with $N_t$ transmission antennas at the BS and K single active-antenna users to achieve $KNT/(K+NT-1)$ DoFs without CSIT. Thus, as K grows the system can approach the CSI-dependent upper bound of min(NT,K) DoFs. This is a striking result since it goes ahead of much of the conventional thinking and conjectures over recent decades, and it provides the potential to relieve the "dimensionality bottleneck" being faced by current systems.

For such a system to work, there is a requirement that the channels seen between the transmitting BS and the K users being served must be jointly changing in a predetermined way (with respect to the blind interference alignment scheme). This joint variation can be accomplished by employing many (physical) antenna elements and a single RF chain at each mobile terminal, where the single active-receive antenna of a user, i.e., the antenna driving the single RF chain of the user, can be varied over time. In other words, the single active receive antenna is a multi-mode antenna that is able to switch between, e.g., NT modes in a pre-determined fashion. The modes create independent (e.g., linearly independent) CSI vectors for the single user. Transmission also has to be confined to a suitable coherence interval in time over which the CSI in a given mode, though unknown to the system, is assumed to be effectively constant and different from mode to mode. The BIA technique works by creating a suitable antenna mode switching and combined data transmission vector over the K information bearing streams that are to be sent to the K users (one stream carries the intended information for one user).

Recently, a new class of MU-MIMO techniques has emerged, which take advantage of outdated CSIT to enable increases in DoFs via "Interference Alignment" (IA) at each of the receivers. What is attractive about these schemes is that the required CSIT is allowed to be fully outdated. In particular, these schemes enable DoF gains by only exploiting knowledge of past channels and rely on no knowledge of the current channel state at the transmitter (i.e., it requires no knowledge at the transmitter of the user channels over which transmission is about to take place). This is in sharp contrast to conventional MU-MIMO systems, whose efficacy intimately depends on the accuracy of the CSIT at the time of the data transmission. That is, the efficacy of conventional MU-MIMO intimately depends on how accurately the transmitter knows a priori the channels over which data transmission in MU-MIMO is to take place. It is possible for a Multi-User MIMO (MU-MIMO) system with $N_t$ transmission antennas at the BS and L single-antenna users to achieve $K/(1+1/2+1/3+\ldots+1/K)$ DoFs with outdated CSIT, where K=min(NT, L). As K grows the system DoFs grow as $K/(\gamma+\log(K))$, where $\gamma$ is the Euler-Mascheroni constant and is number between 0.57 and 0.58.

MU-MIMO schemes based on outdated CSI at the transmitter have some inherent challenges and limitations in the scenarios in which they are used. The first inherent issue is that they often require high Signal to Noise Ratios (SNR) to operate effectively. For example, the original IA scheme may require up to 20 dB of SNR. This is due to a property of the interference alignment process, which results in noise being amplified in the resulting interference-aligned streams. As a consequence of this, the original IA technique has limited application to many users in a cellular environment. For example, cell-edge users in conventional cellular often experience Signal-to-Interference-plus-Noise-Ratios (SINR) on the order of 0 dB or less, due to the interference coming from interfering cells not serving the K users. Many users, not just cell-edge users, do not have SINRs on the order of 20 dB or more. Because these schemes however can rely on completely outdated CSI, these schemes have less stringent requirements for user scheduling based on the collected CSIT.

SUMMARY OF THE INVENTION

A method and apparatus is disclosed herein for scheduling and MU-MIMO transmission based on outdated channel state information. In one embodiment, the multi-user (MU)-MIMO wireless communication system has a multi-antenna transmitter and L user terminals, and the method comprises scheduling a pair of user packets for a round-2 transmission to form one MAT session using outdated channel state information at the transmitter (CSIT), including a first packet destined for a first user terminal and a second packet destined for a second user terminal, based on knowledge of user channels from transmissions to some or all L user terminals into and based on a utility function, combining eavesdropped observations from two of the plurality of round-1 transmissions, the eavesdropped observations including information indicative of round-1 eavesdropped channels feedback from the first and second user terminals, and transmitting the combined observations of the pair of user packets as part of the round-2 transmission.

In another embodiment, the method comprises scheduling a round-r transmission slot during which a degree-r message is to be transmitted, wherein the degree-r message is a linear combination of r eavesdropped round-(r−1) messages intended for a set of r users, each of the r eavesdropped round-(r−1) messages constituting a message eavesdropped by a different user in the set of r users and intended for the remaining r−1 users, such that the degree-r message being simultaneously useful to r users, and further including independently selecting each of the r eavesdropped round-(r−1) messages as being one of the best eavesdropped observations of each said round-(r−1) message based on a utility function; and transmitting messages from the set of messages created by the scheduler using a plurality of antennas.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates a 2-user MAT scheme for MU-MIMO transmission based on outdated CSI.

FIG. 2 illustrates Round-1 transmissions for the 2-user MAT scheme in FIG. 1.

FIG. 5 illustrates the K=3 user, 2-Round MAT scheme for MU-MIMO transmission based on outdated CSI.

FIG. 6 illustrates the K=3 user, 3-Round MAT scheme for MU-MIMO transmission based on outdated CSI.

FIG. 7 illustrates scheduling with a 2-Round IA/MU-MIMO transmission based on outdated CSI using K (out of the possible $N_T$, with $2 \leq K \leq N_T$) transmitting antennas.

FIG. 8 illustrates a User-m buffer containing CSIT from round-1 transmissions of $N_m$ packets of user m, waiting for pairing and round-2 transmission.

FIG. 11 illustrates a sample instance of a round-2 pairing queue for users m and n with m<n.

FIG. 12 illustrates a comparison between MAT-session and packet-centric scheduling for K=3 users and R=2 round, involving a given packet of user 1, in this case packet 6.

FIG. 14 illustrates scheduling with a 3-Round IA/MU-MIMO transmission based on outdated CSI using K (out of the possible $N_T$, with $3 \leq K \leq N_T$) transmitting antennas.

FIG. 17 illustrates a qualitative comparison between MAT-session and packet-centric scheduling for the case K=3 and R=3, based on an example involving a given packet of user 1, in this case packet 6.

FIG. 18 is a block diagram of one embodiment of an apparatus for use in a multi-user (MU)-MIMO wireless communication system

DETAILED DESCRIPTION OF THE PRESENT INVENTION

Figure 3:
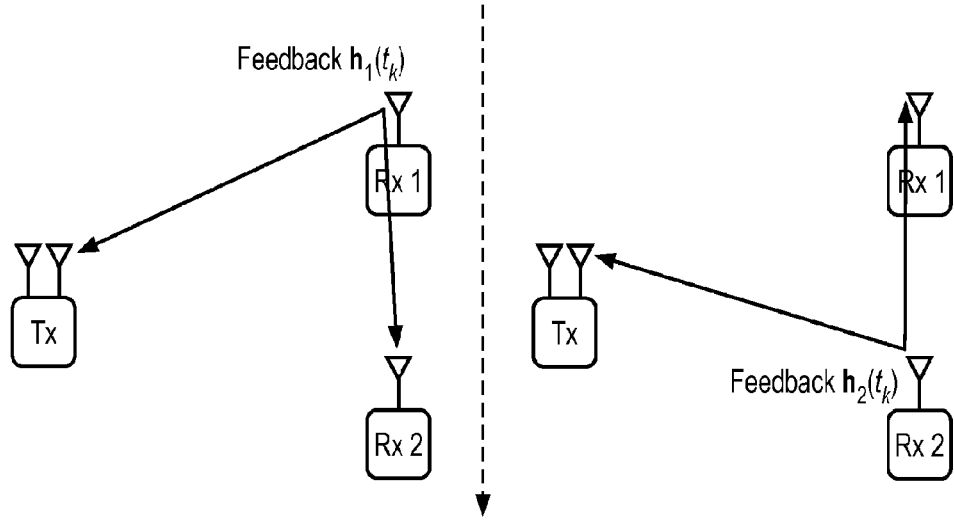
FIG. 3 illustrates Round-1 CSI feedback to enable the second-round transmission of the 2-user MAT scheme in FIG. 1.

Recently, a new class of MU-MIMO techniques has surfaced that rely on outdated CSI at the transmitter. They are referred to as MAT schemes (see Maddah-Ali et al., "Completely stale transmitter channel state information is still very useful," in Allerton Conference on Communication, Control and Computing, September 2010), and exploit transmission mechanisms based on outdated CSIT, which enable "Interference Alignment" (IA) at each receiver. They have thus demonstrated the possibility to grow DoFs without requiring the strict timeliness constraints on the use of CSIT that are inherent in conventional MIMO systems.

Embodiments of the invention include mechanisms for scheduling MU-MIMO transmissions based on outdated CSIT. One class of embodiments of the invention include techniques for scheduling groups of users for MAT transmission sessions. In the simplest form of an example of such a system, a multi-antenna transmitter simultaneously serves multiple single-antenna users, by transmitting jointly coded data streams over the same transmission resource. In these MU-MIMO schemes, outdated CSIT is used at the transmitter to support simultaneous transmission to multiple users by enabling what is referred to herein as Interference Alignment (IA) at each of the user terminal receivers. As explained herein, however, these scheduling schemes have limited scheduling benefits when they involve MAT sessions with more than two users.

Embodiments of the invention also include another class of embodiments that are not (MAT) session-centric but rather packet-centric. These packet-centric schemes exploit the same IA principles as the MAT schemes and have the same DoFs as the associated MAT schemes. However, as these schemes are packet-centric, they offer significantly more flexibility with scheduling and can readily provide scheduling benefits serving more than two users, in contrast to their MAT-session based counterparts.

Thus, embodiments of the invention include mechanisms for scheduling transmissions that exploit outdated CSIT. These mechanisms can enable user, cell throughput, and cell-edge throughput benefits. They are mostly appropriate for delay tolerant traffic. At the cost of delay and additional feedback resources, they can yield significant performance benefits.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention include methods for scheduling MU-MIMO transmission based on outdated channel state information at the transmitter (CSIT). Unlike conventional MU-MIMO, the schemes considered in one embodiment involve transmissions exploiting past CSIT, which are not restricted to take place in time-frequency resource elements whose channels are sufficiently close to the CSIT. As a result, these schemes offer significant flexibility in scheduling. As these new MU-MIMO schemes obtain DoF increases through coordinated multi-round transmission, the possible scheduling options and constraints are very different to the ones for conventional MU-MIMO schemes. Although CSIT can be obtained in a manner similar to other conventional transmission schemes including conventional single-user MIMO (SU MIMO) and multiuser MIMO (MU MIMO), the fact that the CSIT need not represent the actual state of the channel at the time it is collected, allows significantly more flexibility in the way it is collected. As explained herein, it can enable high-performance scheduling protocols.

The scheduling schemes in embodiments make use of a recent MU-MIMO scheme and its principles. This MU-MIMO scheme is presented in Maddah-Ali et al., "Completely stale transmitter channel state information is still very useful," in Allerton Conference on Communication, Control and Computing, September 2010 (hereinafter "the MAT paper"), and it is henceforth referred to herein as the MAT scheme. The MAT scheme establishes multi-round transmission sessions for serving groups of multiple users simultaneously. Each MAT session has several transmission rounds (henceforth denoted by R) that are assumed to happen in a causal fashion: round 1 transmissions in a session occur first, round 2 transmissions come after round 1 transmissions for the same session, etc). In the k-th round of transmissions for k>1, the scheme exploits CSIT from only past transmission rounds (for the same session) to perform MU-MIMO transmission. This CSIT from past rounds enables serving multiple users simultaneously by enabling what is known as interference alignment (IA) at each receiver.

Embodiments of the invention include scheduler operation options on the MAT scheme; that is, embodiments include methods for scheduling sessions of the MAT scheme. More important, however, embodiments provide flexible and high-performance operation by relying on new packet-centric (rather than MAT-session centric) scheduling algorithms, which rely on the interference alignment principles that enable the MAT scheme, but no longer implement the MAT scheme. As explained herein, these new packet-centric schemes offer a superior medium for enabling performance gains based on scheduling (superior with respect to the original session-centric viewpoint).

In order to explain the scheduling mechanisms put forward herein, described below is the original MAT scheme. Thereafter, embodiments of the invention that consider scheduling MAT sessions are described. Finally, embodiments of the invention that involve packet-centric scheduling based on outdated CSI are disclosed.

The Original MAT Scheme

In the original MAT scheme, information-bearing signals are simultaneously communicated to K single-antenna receivers from a single transmitter with K transmit antennas based on outdated CSI at the transmitter. In general, if the number of receivers is L and the number of transmit antennas is $N_T$, then K is the minimum of L and $N_T$. The scheme, as well as its associated scheduling mechanisms (discussed further below), also naturally extend to K users, each with NR antennas, and a transmitter with KNR antennas.

A set of R rounds is employed by the MAT scheme, for some integer R satisfying $2 \leq R \leq K$. For all transmissions in round r, with r>1, it is assumed that the transmitter has available CSI from past transmission rounds, i.e., the channels between the transmitter and each of the K users for all transmissions that occurred in rounds 1, 2, . . . , r−1. As shown in the MAT scheme, the highest DoFs that can be achieved with K single-antenna users, a K transmit-antenna terminal and outdated CSI are given by the formula:

$$\text{Maximum } DoFs = \frac{K}{1 + \frac{1}{2} + \ldots + \frac{1}{K}}$$

Letting $DoFs_{MAT}(K,R)$ denote the DoFs provided by the R-round MAT scheme serving K single antenna users from a K transmit-antenna transmitter with outdated CSIT, the following equation applies:

$$DoFs_{MAT}(R, K) = \frac{K}{\sum_{r=1}^{R} \frac{1}{r} + \frac{1}{R}(K - R)}$$

Thus, R=K rounds are required by the MAT scheme to achieve the highest possible DoFs. However, any value of R>1 yields DoFs higher than 1, and thereby MU-MIMO DoFs benefits with outdated CSI. Below are a couple of representative MAT scheme examples, starting with two-round schemes.

Two-User MAT Scheme

FIG. 1 shows the MAT scheme corresponding to the K=2 user case for MU-MIMO transmission based on outdated CSI [See the MAT paper]. The transmitter (Tx) is assumed to have (at least) K=2 transmit antennas 201 as shown in FIG. 2. Referring to FIG. 1, the round-1 message for the m-th user, $x_m$, is a 2×1 vector and is transmitted at some time $t=t_k$. At any given time, t, the (scalar) observation of user m is given by thermal noise plus a signal term, $z_m(t)$, induced by the signal transmitted at time t by the TX. The 1×2 vector $h_m(t)$ denotes the channel coefficients between the two transmit antennas and the receive antenna of user m at time t. Note that the round-2 message, $x_{1,2} = h_2(t_1)x_1 + h_1(t_2)x_2$, is a scalar. The steering vector v is a fixed arbitrary 2×1 vector known to the receivers. The scheme uses 2 round-one transmission slots and one round-2 slot to deliver 2 two-dimensional messages ($x_1$ and $x_2$) over 3 slots, resulting in DoFs=2×2/(2+1)=4/3 scalar symbols per slot. That is, the scheme delivers to user m for m=1,2 a 2×1 vector $x_m$ over 3 transmission slots (3 channel uses). The first two transmissions occur at some arbitrary times $t_1$ and $t_2$ and are round-1 transmissions. These are shown in FIG. 2. In particular, as shown in FIG. 2, at time $t_m$ the transmitter transmits the two scalar entries of $x_m$ (corresponding to two scalar coded symbols for user m) over its two antennas 201. The key here is that both receivers (Rx1, Rx2) are collecting measurements from this transmission and store it for further use. That is, receiver (Rx) 1 collects the measurement at time $t_1$, which is associated with the vector that it wants to decode, but it also eavesdrops on the transmission at time $t_2$ (intended for user 2) and stores the resulting measurement for later use. Receiver (Rx) 2 also acts accordingly.

The channel between user m and the transmitter at time t is denoted by $h_m(t)$. Note that the channels between a given user and the transmitter at times $t_1$ and $t_2$ (which are listed as being distinct but they could also be exactly the same) are not known at the transmitter during the round 1 transmissions. They are known, however, to the given user and will be fed back to the transmitter (and the other receiver) at a later time. Specifically, although not shown explicitly in the figures, during slot $t_m$, the transmitter also transmits pilots (in the downlink) that enable both users to estimate their respective channels.

The eavesdropped channels are fed back at some later time to the Tx as shown in FIG. 3. Note that as FIG. 3 shows, the channel fed back by user 1 is also made available to user 2 (and vice versa). Although FIG. 3 suggests that this is done directly from one user to the other, in alternative embodiments the CSI transfer can also be achieved through the transmitter. The CSI feedback enables the round 2 transmission of the 2-user MAT scheme of FIG. 1.

Figure 4:
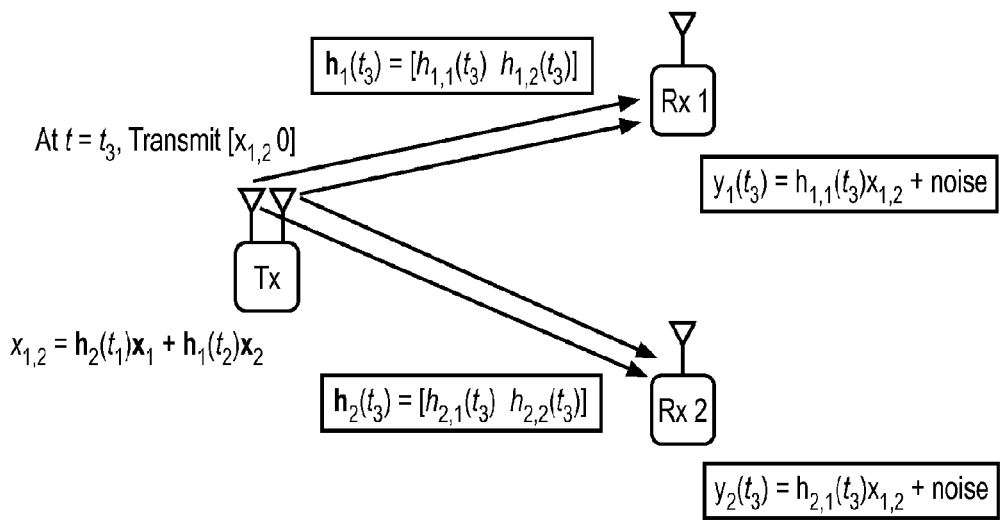
FIG. 4 illustrates a Round-2 transmission for the 2-user MAT scheme in FIG. 1.

The third transmission (i.e., the round 2 transmission) occurs at some arbitrary but later time $t_3$, i.e., $t_3 > t_1$ and $t_3 > t_2$, as shown in FIG. 4. By that time the transmitter has available the required channels to form the signal $x_{1,2}$ shown in FIG. 1. This signal is the sum of the two eavesdropped measurements, and is thus a scalar. If it were available at receiver m (m=1,2) it would allow the receiver to subtract off its own eavesdropped measurement (stored locally) and get a copy of the eavesdropped measurement of the other user. That measurement is a measurement of its own signal, and would allow the receiver to decode its own 2-dimensional message. The TX transmits this signal, $x_{1,2}$, over, e.g., one of its antennas (in which case the vector v has a single non-zero entry). Each receiver then uses the measurement to strip out the interference, i.e., the measurement it has already eavesdropped, and obtain a measurement pertaining to its own signal (the one eavesdropped by the other user). As a result 4 distinct scalar symbols are delivered (two to each user) over 3 slots for DoFs=4/3 (i.e., the maximum possible DoFs with K=2).

K-User Two-Round MAT Scheme

A K=3, 2-Round MAT scheme described in the MAT paper is shown in FIG. 5 and involves three single-antenna users and a transmitter with (at least) 3 antennas. The 2-round MAT scheme delivers to each user a 3×1 vector symbol over 6 slots, resulting in DoFs=3×3/6=1.5 scalar symbols per slot using three round-one transmissions. The k-th round happens at some time $t_k$ and involves transmission of the k-th user vector. All receivers collect and store the round-one transmissions (one is for each receiver, while the rest correspond to eavesdropped transmissions).

Referring to FIG. 5, the K=3 user, 2-Round MAT scheme [1] for MU-MIMO transmission based on outdated CSI. The round-1 message for the m-th user, $x_m$, is a 3×1 vector, while the round-2 messages, $x_{m,n}$, are scalars. The 1×3 vector $h_m(t)$ denotes the channel coefficients between the two transmit antennas and the receive antenna of user m at time t, and the scalar $z_m(t)$ denotes the received signal at receiver m, induced by the signal transmitted at time t by the TX. The steering vector v is a fixed arbitrary 3×1 vector known to the receivers. The scheme takes 3 round-one slots and 3 round-2 slots to deliver 3 three-dimensional messages ($x_1$ $x_2$ and $x_3$) over 6 slots, resulting in DoFs=3×3/(3+3)=1.5 scalar symbols per slot.

The channels associated with all round-one transmissions are then made available to the transmitter via feedback. Once all CSIT from round 1 becomes available at the transmitter, the transmitter proceeds with the three round-2 transmissions, as shown in FIG. 5. Each round-3 transmission involves two users, m and n, and it is the sum of the eavesdropped round-1 measurements of each other's message, as shown in FIG. 5. After round 2, each user takes the two (out of the three) round-2 measurements that involve its own message (eavesdropped by the other users), strips from each measurement its own eavesdropped messages and then combines them with its own measurement of its own message from round 1 for decoding. Decoding is possible at user e.g., 1, as user 1 has three independent measurements of its three-dimensional message: one coming from its own antenna (through the round one measurement at time $t_1$), and two more coming from the antennas of users 2 and 3 (these where eavesdropped at time $t_1$, and made available to user 1 through the round-2 transmissions at times $t_4$ and $t_5$). Similar reasoning shows that decoding is also possible at users 2 and 3.

The scheme K=3, 2-Round MAT scheme in the MAT paper can be readily generalized to a 2-round MAT scheme with arbitrary K. Assuming K single-antenna users and a K-antenna transmitter, it can deliver one K-dimensional message to each of K users, by using K round-one transmissions (one transmission for each of the K, K-dimensional user messages) and K(K−1)/2 round-2 transmissions. The resulting DoFs are 2K/(K+1), as given by equation 2.

Three-User Three-Round MAT Scheme

The 3-user 3-round MAT scheme for MU-MIMO transmission based on outdated CSI described in the MAT paper is shown in FIG. 6 and delivers to each of three users a 6-dimensional message, by using 6 round-1 transmissions (two transmissions per user's signal), three round-2 transmissions, and 2 round-3 transmissions. Two round-one transmissions are used per user to deliver two linearly independent combinations of the 6 scalar symbols comprising the 6×1 information message for the user.

Referring to FIG. 6, the message for the m-th user, $x_m$, is a 6×1 vector. In round one, 2 linearly independent transformations of $x_m$ are transmitted over two slots. These are described by the two 3×6 matrices, $V_1(1), V_1(2)$. The round-2 messages, $x_{m,n}$, are 2×1 vectors and each is transmitted over a single slot via a linear transformation described by the 3×2 matrix $V_2$.

The single round-3 message, $x_{1,2,3}$, is a 3×1 vector that is transmitted over two slots via two linearly independent combinations described by the 3×3 matrices $V_3(1)$, and $V_3(2)$. The matrices $V_1(1)$, $V_1(2)$, $V_2$, $V_3(1)$, and $V_3(2)$ are known at the receivers. The scheme takes 6 round-one slots, 3 round-2 slots and 2 round-3 slots, to deliver 3 6-dimensional messages ($x_1$ $x_2$ and $x_3$) over 6 slots, resulting in DoFs=6×3/(6+3+2)=18/11 scalar symbols per slot.

One such example corresponds to using $V_1(1)$=[$I_3$ 03×3] and $V_1(2)$=[03×3 $I_3$], where 03×3, is a 3×3 matrix of all zero entries, and $I_3$ is a 3×3 identity matrix. It results in transmitting the first 3 entries over the 3 transmit antennas in the first transmission slot, and the last three symbol entries in the second transmission slot. At any given user, each pair of eavesdropped signals, arising from the two round-1 transmissions of another user's vector symbol, are placed into a two-dimensional vector and are stored for later use.

Once the round-1 channels are fed back and are available at the transmitter, the round-2 transmission can take place. First, as shown in FIG. 6, the transmitter regenerates locally the two-dimensional eavesdropped messages at each receiver (two such vector messages per receiver). Similar to the 3-user 2-round case, for each user pair (m, n), the transmitter first forms $x_{m,n}$, the (2×1 vector) sum of the eavesdropping of user n of the message of user m and the eavesdropping of user m of the message of user n. The transmitter then has a single transmission per $x_{m,n}$ (total of 3), described by the 3×2 predetermined matrix $V_2$. As one example, the last row of $V_2$ is a row of all zeros (no signal transmitted from the third antenna element at the transmitter), while the coefficients comprising the top two rows of $V_2$ are non-zero entries that comprise a 2×2 rank-2 matrix.

Once the round-2 channels are fed back, the round-3 transmissions can take place. A single 3-dimensional message is then formed at the transmitter based on one eavesdropped message per receiver. For each receiver, the eavesdropped message corresponds to the round-two reception of the signal that is simultaneously useful to the other two receivers.

In round 3, the transmitter transmits two distinct (and suitably chosen) combinations of these three dimensional symbols described by $V_3(1)$ and $V_3(2)$. In one example the two last rows of $V_3(k)$ are set to zero. Referring to the top row of $V_3(k)$ as $v_3(k)$, it suffices that $v_3(1)$ and $v_3(2)$ are not co-linear and all their entries are non-zero. The two transmissions in round 3 are simultaneously useful to all three receivers and allow each receiver to strip out the unwanted eavesdropped components and together with the round 1 and round 2 measurements, decode their own 6-dimensional messages. The scheme yields DoFs=18/11 (the maximum possible with K=3 and outdated CSI).

Embodiments that are presented below involve schedulers that operate on a set of L single-antenna users and schedule K-user MU-MIMO MAT sessions. In each case, it is assumed that the transmitter has available NT transmitting antenna elements with NT≥K. Embodiments involving schedulers operating on a set of L users with NR receive antennas each (NR>1) and scheduling K-user MU-MIMO MAT sessions can be obtained via straightforward extensions of the associated K-user MU-MIMO MAT session embodiments described below. These multi-antenna embodiments require that the transmitter have available NT transmitting antenna elements with NT≥NRK. Similar multi-antenna extensions of the packet-centric embodiments described further below can also be constructed. Finally, additional options can be included in the schedulers as straightforward extensions. One such extension involves embodiments with schedulers that are given the ability to provide different transmit powers to each eavesdropped message in a pairing (e.g., by considering several relative-power allocation options). For example, in a round-two transmission involving two eavesdropped messages, $z_a$ and $z_b$, the scheduler may select to transmit a weighted sum of the form $\lambda_a z_a + \lambda_b z_b$, where the pair ($\lambda_a$, $\lambda_b$) involves a combination of positive numbers, chosen by the scheduler from a list of allowed pairings, e.g., based on some system performance metric used at the scheduler.

Embodiments Involving Scheduling and MU-MIMO Based on Outdated CSI by Enabling Time-Staggered MAT-Scheme Sessions In one embodiment, users and their packets are paired for a session involving a K-user R-round MAT scheme from the MAT paper. The initial discussion focuses on describing instantiations of the scheme for the case K=2, R=2. The limitations of the approach for K or R greater than 2 are described.

Scheduling 2-User 2-Round MAT-Scheme Sessions

Embodiments of this section involve scheduling protocols according to which two distinct packets, one per distinct user are paired and scheduled for a single 2-user 2-round MAT session such as the one shown in FIG. 1. In particular, assume that the scheduler is operating on the input packet queues of L users, and let $x_m(i)$ denote the i-th packet intended for the m-th user. In all embodiments the scheduler pairs this packet with the j-th packet of the n-th users for some user n≠m (i.e., a different user) and some packet with index j. The transmission protocol is then described in each round according to FIG. 7 and involves IA/MU-MIMO transmission based on outdated CSI using K (out of the possible $N_T$, with 2≤K≤$N_T$) transmitting antennas. The two round-1 transmissions are at times t=$t_m(i)$ and t=$t_n(j)$, for transmitting separately $x_m(i)$ and $x_n(j)$, respectively, and a single round-2 transmission is performed at some time t=$t_{m,n}(i,j)$, which occurs sufficiently later in time, to allow the required round-1 eavesdropped channels to be available at the transmitter, in order to enable the round-2 transmission. Note that although a single message (or packet) is considered as being a single vector, in general, it is a representation of a collection of packets, each experiencing the same channel and transmission mechanisms. In that sense, each transmission time corresponds to a collection of transmission slots over time and frequency during which the channels stay effectively constant.

Referring to FIG. 7, the round-1 i-th message for the m-th user, $x_m(i)$, is a K×1 vector, while the round-2 messages, $x_{m,n}(i,j)$, are scalars. The 1×K vector $h_m(t)$ denotes the channel coefficients between the K active TX antennas and the RX antenna of user m at time t. The scalar $z_m(t)$ denotes the received signal at user m, due to the signal transmitted at time t. The vector v is a fixed arbitrary K×1 vector known to the receivers. A scheduling scheme using 1 round-one slot per user packet and K−1 round-2 slots which involves the same packet, delivers one K-dimensional message over 1+(K−1)/2 slots, yielding DoFs=2K/(K+1) scalar symbols per slot. Note that K−1+n round-2 slots can also be used per packet with n≥1, yielding DoFs=2K/(K+1+n).

Sample embodiments are presented here that highlight various scheduler operations, in terms of selecting the user packet pairings and the two-round transmission times for these packets. For simplicity, in all embodiments it is assumed that, when eavesdropped channels from round 1 are available at the transmitter for some users, they are also available from all other users, i.e., it is assumed that all users feed back all their eavesdropped channels and the channels for the packets intended for them. However, this is not necessary. Embodiments of the invention however readily generalized to the case where only a subset of eavesdropper channels per user packet are available for scheduling.

First, note that the benefits of proper user-packet pairings, i.e., the benefits of pairing the i-th packet of user m with the j-th packet of user n for a MAT session, are a function of the round-1 channels that users m and n experience, i.e., the channels of user m and n at times $t_m(i)$ and $t_n(j)$. In particular, we have the following observations:
1. The capacity, or effective maximum rate to user m offered by the two-session MAT scheme on its i-th packet strongly depends on the following:
   a. the pair of channels $\{h_m(t), h_n(t)$ at time $t=t_m(i)\}$; as the pairing determines $h_n(t_m(i))$, the effective delivered rate to user m through packet i is dictated by "how well" the n-th user's (eavesdropped) channel pairs with the m-th user's channel in terms of delivered capacity to user m;
   b. the associated round-2 channel at user m, i.e., $h_m(t)$, at time $t=t_{m,n}(i,j)$.
2. The capacity, or effective maximum rate to user n offered by the two-session MAT scheme on its j-th packet strongly depends on the following:
   a. the pair of channels $\{h_m(t), h_n(t)$ at time $t=t_n(j)\}$; as the pairing determines $h_m(t_n(j))$, the effective delivered rate to user n through packet j is dictated by "how well" the m-th user's (eavesdropped) channel pairs with the n-th user's channel in terms of delivered capacity to user n;
   b. the associated round-2 channel at user n, i.e., $h_n(t)$, at time $t=t_{m,n}(i,j)$.

In one embodiment, round-r transmissions are scheduled based on knowledge of user channels from previous round transmissions only. In the context of the two-round protocols, this means that the scheduler does not take advantage of the effects in 1b and 2b above, since these rely on knowledge of the round-2 channels, which are only available after the session is over. Of course, the presented schedulers can also be modified to take advantage of some partial or full CSI information about the second round.

Benefits of scheduling come from the ability of the scheduler to pair users so as to simultaneously benefit both users in terms of 1a and 2a above. In particular, the scheduler can use all the available user channels on all round-one packet transmissions, to enable user-packet pairings for round-2 transmissions, in such a way that the associated round-1 channel pairings yield high expected channel capacity for both users (in terms of 1a and 2a).

One constraining factor in these pairings is that a pairing of the i-th packet of user m with the j-th packet of user n should be simultaneously good for both packets. Thus, given (m, i), the scheduler may find a pairing (n, j) that yields the best expected capacity to user m on the session serving its i-th packet. However, there is no guarantee that this is a good pairing for the j-th packet of user n. What allows schedulers with simultaneously high pairing performance is the following observation: what matters for user m regarding its i-th packet is only the n-th user's eavesdropping channel, and not its packet index, j. To see how this can be utilized consider the following: assume that, regarding the i-th packet of user m, the eavesdropped channel of user n is the best among all eavesdropped user channels (during the round-1 transmission of the i-th packet of user m) that are available at the TX. If the scheduler had enough available round-1 packet transmissions for user n (that are waiting, e.g., in a queue, for round-2 transmission) such that it could find one packet index j for which the eavesdropped channel of user m happened to be a good eavesdropped channel for the j-th packet of user n, then pairing (m, i) and (n, j) yields simultaneously high performance to both users, and thus good overall performance.

To enable exploiting such pairing benefits, it is required that the scheduler has multiple packets per user that are available for pairing. In particular, in all embodiments presented herein, the TX maintains an additional queue per user, i.e., a round-2 input queue. This is in addition to the input-queue for the user, which contains user packets that have not been served yet.

The round-2 input queue for user m contains one entry for each packet of user m waiting to be served in a round-2 transmission. The entry corresponding to the i-th packet from user m contains information from the round 1 transmission of the packet that can be used to set up favorable MAT scheme sessions involving the packet. In one embodiment, the entry contains the eavesdropped channels of all (or a subset of) the other users during the round-1 transmission of i-th the packet for user m. The entry may contain other information pertinent for scheduling, including the quality of each eavesdropped channel estimate, the maximum allowed delay for round-2 transmission before discarding the packet, etc. In order to fill the (initially empty) round-2 buffers, an initialization stage is included for each user, whereby a sufficiently large number of packets, N, for the user are transmitted via a round-one transmission (in general N can also depend on the user index). Once feedback is collected on the eavesdropped channels during the transmissions from other users and the user buffer contains a sufficiently large number of entries, the user can be considered for scheduling. As a result, at any time user m is considered for round-2 scheduling, the TX has available a round-2 input buffer of the form $800m$, as shown in FIG. 8. The buffer $800_m$ includes N columns (where the value of N may also depend on the user index, m), depicted as $801_m$, $802_m$, ..., $80N_m$. At any given scheduling instance, the k-th column, $80k_m$, contains information about some packet of user m, with some index $i_k$. In particular, it contains the channel state between the transmitter antennas and a receive antenna of a user at the time the packet $i_k$ of user m was transmitted, for a subset of users. In one embodiment, the subset equals the whole set of users considered in scheduling. In one embodiment, it is a strict subset, whose elements are m-index and k-index dependent, and are chosen in a deterministic fashion or by means of some other mechanism.

Scheduling 2-user 2-round MAT sessions corresponds to choosing pairs of users m, n and pairs of packets i (for user m), j (for user n), to enable a transmission of the form of FIG. 7. Note that the pairing performance depends on the user channels during both round 1 and round 2. However, as the round-1 transmissions contain only individual packets, the pairing can (and should) be decided after round-1 is completed and the round-1 channels are available at the transmitter. As a result, the MAT sessions can be scheduled by selecting user-packet pairs for round-2 transmission based on available CSIT at the transmitter from round 1 transmission.

Figure 9:
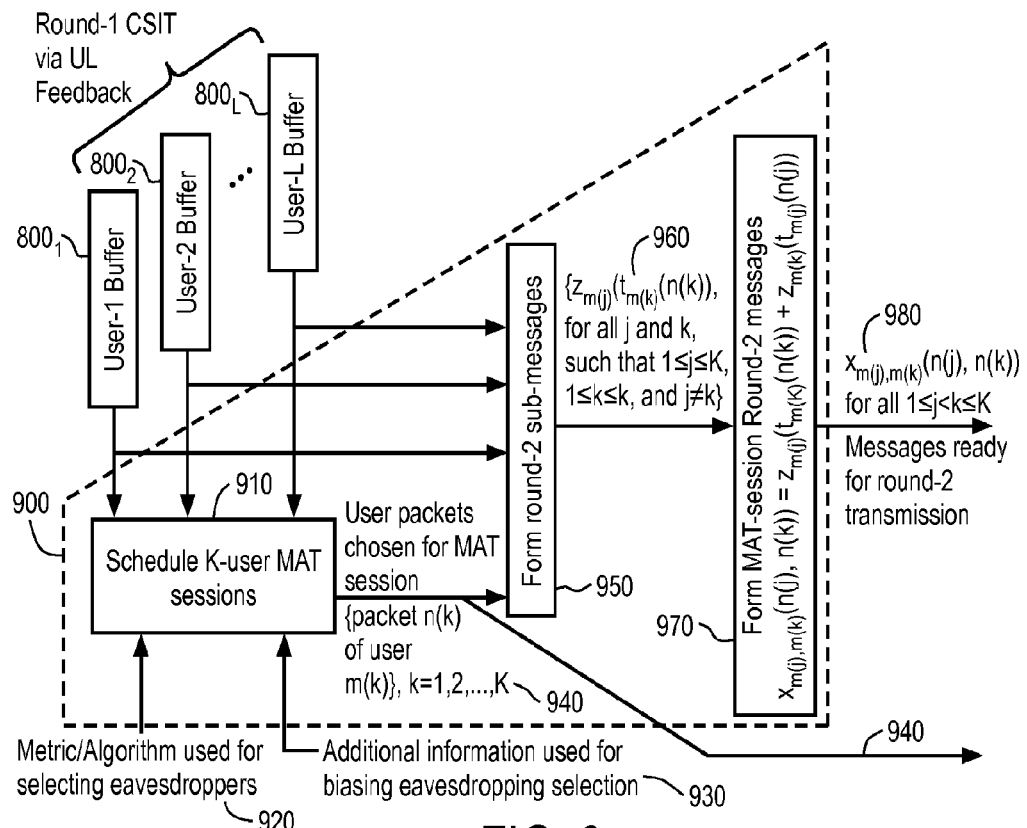
FIG. 9 illustrates a MAT-session based scheduler operation.

The general MAT-session based scheduler operation is shown in FIG. 9. At each scheduling instant, the scheduler takes as input the user input buffer lists, $8001, 8002, \ldots, 800L$, and produces as its output a set of user-packet pairs of indices chosen for a MAT MU-MIMO session (940). The scheduler also produces a set of messages (depicted in FIG. 9 as 980) that wait for round-2 transmission. For instance, assuming the m-th user's i-th packet and the n-th users j-th packet have been chosen as participants in the MAT session module 900 will generate as (one of) its output(s), 980, the message $x_{m,n}(i,j)$. To do so, module 950 first generates (locally at the transmitter) the associated eavesdropped messages $z_m(t_n(j))$ and $z_n(t_m(i))$. In particular, the m-th eavesdropper's channel at time $t_n(j)$, $h_m(t_n(j))$, and the associated message, $x_n(j)$, are fetched from the column of the user-n buffer list, 800n, containing the information about the j-th packet of user n, and are used by 950 to locally construct (and output in 960) the sub-message $z_m(t_n(j))$, i.e., the (noise-free) observation obtained at (eavesdropping) receiver m during the transmission of the j-th packet of user n in round 1. Similarly, module 950 computes and outputs sub-message $z_n(t_m(i))$. Then, $z_m(t_n(j))$ and $z_n(t_m(i))$ are combined by module 970 to produce $x_{m,n}(i,j)$ at the output, 980.

In one embodiment, at any time instance dedicated to round-2 transmission, the scheduler considers, for each user-packet pair, $\{(m, i), (n, j)\}$, the expected capacity increase for each user (m and n), and uses it to determine its incremental utility benefits (e.g., based on a weighted sum-rate calculation function). In one embodiment, the expected capacity increase is calculated for, e.g., user m, by exploiting availability of the round-1 channels of users m and n at time $t_m(i)$. Both channels are stored in the round-2 input queue of user m. After following this exhaustively for all user-packet pairs, the scheduler chooses the pairs of user-packets for transmission that yields the highest utility increment. In one embodiment, the set of users L, considered by a scheduler is restricted to be relatively closely located users of similar signal-to-noise ratios (SNR). In this case, the utility metric used for the selection of MAT sessions (for delay tolerant traffic) is usually set as the incremental sum-rate, i.e., the sum of the expected increases in rate for each user in the pair assuming the pairing takes place. When users with unequal SNR levels are involved, the utility metric is typically a weighted sum of the user-rate increments, i.e., a sum of the rate-increments of each user each appropriately scaled with a user-dependent weight factor. These user-specific weights change from scheduling slot to scheduling slot, in a manner well known in the art, and are a function of some system wide utility metric, user dependent parameters based on past scheduling events involving the user (e.g., accumulated user rate), as well as other user/packet parameters (e.g., QoS, allowable delay etc.).

In one embodiment, the round-2 user-input queues have a constant size. In particular, at the time user m enters the scheduling session, $N=N_m$, 2-dimensional packets for the user are transmitted through round-1 transmissions and channels are collected from all of the users (or from a subset of users in the proximity of the user) considered for scheduling. In one embodiment, that enables filling in the round-2 input queue for user m with $N_m$ entries, with each entry containing several eavesdropper options for pairing the given packet. After initialization, the scheduler schedules one MAT session (i.e., three-slot transmissions) at a time. In particular, for each user pair m and n, the scheduler considers all available $\{(m, i) (n, j)\}$ combinations corresponding the packets (m, i) and (n, j) already served with round-1 transmissions. For each combination, the scheduler considers the incremental increase in rate for each user. In one embodiment, the packet $i=i^*$ ($j=j^*$) for user m (n) is chosen as the packet from the round-2 input packet, out of the $N_m$ ($N_n$) available packets, for which the associated eavesdropped channel of user n (m) yields the maximum expected capacity increase for user m (n). In one embodiment, to select the user pair (m, n) for scheduling, the scheduler considers the incremental benefit in the utility function arising from a three-slot transmission involving:

1. a round-2 transmission slot at some time $t^{(2)}$ involving the $i^*=i^*(n)$ packet of user m and the $j^*=j^*(m)$ packet of user n, and 2. two round-1 transmission slots, at times $t^{(1a)}$, $t^{(1b)}$, each involving a new packet for each of the two users, i.e., packet i' for user m and packet j' for user n.

In one embodiment, the (m, n) user combination that yields the highest expected utility increase is chosen by the scheduler for transmission over slots t(1a), t(1b), and t(2). Effectively, the scheduling outcome sets $t_m(i')=t(1a)$, $t_n(j')=t(1b)$, and $t_{m,n}(i^*, j^*)=t(2)$. In parallel, the round-2 input queues for the two served users, m and n, get updated. In one embodiment, the entry of the round-2 input queue for user m that contained the round-1 channel information for the i* packet is emptied and is now reserved for the eavesdropped user channels during the transmission of packet i', and this entry is filled with user channels as these become available through a feedback mechanism.

In one embodiment, the scheduler comprises of a round-1 and a round-2 sub-scheduling functions. Transmission resources (time/frequency slots) are split between the two sub-schedulers for rounds 1 and 2 in a ratio 2 to 1. The round-2 scheduler schedules M round-two sessions at a time, for M≥1. The M user-packet pairings are chosen using the round-2 user-input queues, based the incremental utility benefits, captured by, e.g., a weighted sum rate metric as described above. The sub-scheduler for round-1 can be serving M' round-1 sessions at a time. In one embodiment, M' is set to 2M, the round-1 sub-scheduler is synchronous with the round-2 sub-scheduler, and the round-1 sub-scheduler serves for user m as many round-1 packets as were served by the round-2 sub-scheduler in the same cycle. In one embodiment, the M' slots are used in a round robin fashion among the users to send round-1 packets to the users. In one embodiment, the number of packets sent per user in the round-robin scheme depends on the user index. In one embodiment, involving users with similar SNR levels (or users that are served on average with the same activity fraction over the resources), M' is a multiple of the number of users served by scheduling, L, and M'/L packets are sent per user. Persons skilled in the art can envision many apparent variations of these embodiments.

Scheduling K-User R-Round MAT-Scheme Sessions

Embodiments involving MAT-sessions with K or R greater than two are also possible by extensions of the K=2, R=2 scheme. However, as explained above, the performance benefits that are to be expected from scheduling in such cases are usually limited. Consider for example the K=3 user, R=2 round MAT scheme of FIG. 5. Effectively, the scheduler, shown in FIG. 9, selects three distinct packets at its output, 940, one packet per distinct user (based on available round-2 user input buffers of the form shown in FIG. 8), such that the packet for user k is seen by the three antennas of the 3 users through a favorable combination of (three) channels. One key is that this must simultaneously happen for all three user-packets engaged in the session. It is easy to see that, to get similar types of scheduling benefits as with K=2, significantly larger user/packet combinations need to be buffered. In fact, the required buffered packet size would need to grow exponentially fast with K. The scheduling benefits of MAT-session scheduling (of the form shown in FIG. 9) are even more limited with multiple transmission rounds. For example, consider scheduling 3-user 3-round MAT sessions of the form shown in FIG. 6 via the scheduler in FIG. 9. In these sessions, packets (e.g., six-dimensional coded symbol sequences) for each of three users have to be paired for a session. The pairing decisions can be delayed up until the time round-2 transmissions have to be scheduled. At that point, a scheduler module of the form 900, shown in FIG. 9, decides the 3-user session and generates the round-2 messages for transmission. Once the round-2 packets are transmitted and the required CSIT is collected to enable forming the required round 3 messages (see e.g., FIG. 6), the third round transmission is performed. In terms of the benefits of the round-2 transmissions, the scheme faces the same performance limitations as a 3-user 2-round scheme. However, the benefits from scheduling are further diluted by the existence of round-3 transmissions, since no scheduling benefits can be expected from these transmissions (the user-packet pairing has already been set prior to round-2 transmissions, so knowledge of the round-2 channels cannot be exploited for pairing benefits in round-3).

Embodiments Involving Scheduling and MU-MIMO by Enabling Packet-Centric IA and User Pairing Based on Outdated CSI In some embodiments, wireless communication involving MU-MIMO based on IA occurs based on outdated CSI that allows flexible scheduling and can achieve performance benefits with significantly lower overheads on both scheduler complexity and resources. These embodiments rely in a packet-centric approach to MU-MIMO with outdated CSI. The resulting scheme does not schedule, in general, MAT sessions (except for the case of K=2, and R=2 rounds). However, it uses the same principles as the MAT scheme. It yields the same DoF benefits as the associated MAT scheme, but provides more flexibility for scheduling than the associated MAT schemes.

Scheduling K-User 2-Round Packet-Centric MU-MIMO Sessions Based on Outdated CSI

This packet centric MU-MIMO scheme based on outdated CSI can be illustrated by focusing on the 3-user 2-round scheme. Note that a MAT scheme in this case (see FIG. 5) pairs three user packets (three distinct users; one 3-dimensional symbol per user). It involves 3 round-1 and 3 round-3 transmissions. This enables each user to effectively have three looks at each intended symbol. Consider for example user 1 in FIG. 5. User 1 has 3 observations of its intended packet:
1. Through its own channel: this is based on the observation at time $t=t_1$;
2. Through the eavesdropped channel of user 2: this is based on the observations at time $t=t_4$ and $t=t_2$; in particular, the measurement at time $t=t_4$ gives user 1 the linear combination of its own eavesdropping of user-2's packet and (the desired) user-2's eavesdropping of its own packet. Then user 1 uses the measurement at time $t=t_2$ to cancel out its own eavesdropping of user-2's packet for its measurement at $t=t_4$ and obtain the eavesdropped observation of user-2 regarding packet of user 1.
3. Through the eavesdropped channel of user 3: this is based on the observations at time $t=t_5$ and $t=t_3$; in particular, the measurement at time $t=t_5$ gives user 1 the linear combination of its own eavesdropping of user-3's packet and (the desired) user-3's eavesdropping of its own packet. Then user 1 uses the measurement at time $t=t_3$ to cancel out its own eavesdropping of user-3's packet for its measurement at $t=t_5$ and obtain the eavesdropped observation of user-3 regarding the packet of user 1.

The measurement at time $t_4$ simply allows transferring to user 1 the measurement of the packet for user 1 obtained at user 2. This measurement simultaneously helps user 2. In particular the measurement at time $t_4$ also allows transferring to user 2 the measurement of its own packet obtained at user 1. Similarly the measurement at time $t_5$ allows transferring to user 1 (3) the measurement of the packet of user 1 (3) obtained at user 3 (1).

In summary, each user packet is transmitted once in a round-1 transmission (on its own), and twice in a round-2 transmission, each time in the form of a sum of an eavesdropped measurement at another receiver (desired) with the eavesdropped measurement at user 1 intended for the other receiver (which can be locally cancelled).

To motivate the packet-centric 3-user 2-round scheme, consider an arbitrary but fixed packet, i, for user m, with m=1. User 1 will get three independent looks at the packet as long as:
1. The user's packet is transmitted once through a round 1 transmission
2. The user's packet is transmitted two times through a round-2 transmission;
3. The k-th round-2 transmission, for k=1, 2 involves the eavesdropping of the packet through another user $n_k$ and user 1's eavesdropping of some packet intended for user $n_k$.
4. The users $n_1$ and $n_2$ are distinct.

What matters from the point of view of user 1 is simply the quality of the eavesdropped channels in conjunction with its own intended channel during time tm(i), i.e., at the time packet i was transmitted. The packet-centric embodiments described herein exploit the following fact: what matters is choosing the users the users $n_1$ and $n_2$ for pairing this packet, and not the packets of users $n_1$ and $n_2$ with which the packet would be paired. Thus, based on feedback information on the eavesdropped channels in the round-1 transmission of packet i, in packet-centric embodiments, the scheduler selects the users $n_1$ and $n_2$ for pairing. The scheduler follows this process for each user's round-1 packets and determines the users with which each packet would be paired. Note that, given L users, there are a total of L(L−1)/2 possible distinct pairs of users.

In one embodiment, the scheduler uses L(L−1)/2 pairing-queues for round-2 transmission. Each of these queues facilitates paired transmission between two users. Let queue (m, n) denote the round-2 pairing queue for users m and n with m<n (since only one of the (m, n) and the (n, m) queues is needed, only queues with m<n are used). Such a queue is shown pictorially in FIG. 11. Referring to FIG. 11, the round-2 pairing queue consists of two sub-queues, one that takes inputs from packets intended for user m (which have been eavesdropped through user-n's channel) and a second one that takes inputs from packets intended for user n (and which have been eavesdropped through user m's channel). Thus, the pairing queue consists of two sub-queues ($1110_{m,n}$ and $1120_{m,n}$), one per user. The top (bottom) sub-queue in FIG. 11 takes as input eavesdropped messages at user n (m) of round-1 messages intended for user m (n). The input messages are selected by scheduling modules $1000_m$ and $1000_n$, which schedule eavesdropped sub-messages for packets intended for users m and n, respectively, in the manner depicted in FIG. 10 (shown for user 1). To perform the selection, module $1000_m$ ($1000_n$) uses CSI regarding the channels between the transmitter and users n and m (and preferably other users) at the time of round-1 transmissions of these user m (user n) packets. When both sub-queues $1110_{m,n}$ and $1120_{m,n}$ have elements waiting, a combiner module $1130_{m,n}$ takes one entry from each queue at a time and combines them to form messages for round-2 transmission. Thus, in one embodiment, a combiner module in the queue takes two packets, one from each of the two sub-queues, and combines them, thereby creating in the process a paired packet for round-two transmission. The resulting round-two paired packets are placed in the output queue (module $1140_{m,n}$) of the (m, n) paired queue and are ready for transmission.

In one embodiment, the scheduler for the i-th packet for user m determines the users $n_1$ and $n_2$, whose eavesdropped channels (during the transmission of the i-th packet of user m) would yield the best three independent looks of packet i at user m (in terms of expected capacity). Then, user m places the i-th packet in the (m, $n_k$) queue along with the associated eavesdropped channel of user $n_k$, for k=1, 2. In one embodiment, additional criteria are used to select $n_1$ and $n_2$. Such criteria may bias the frequency of selection of different users for pairing, and may account for the fact that, for a given utility optimization, user QoS, or rate requirements, some users may be needed to construct more pairings than others as their activity fractions of service may be higher.

Figure 10:
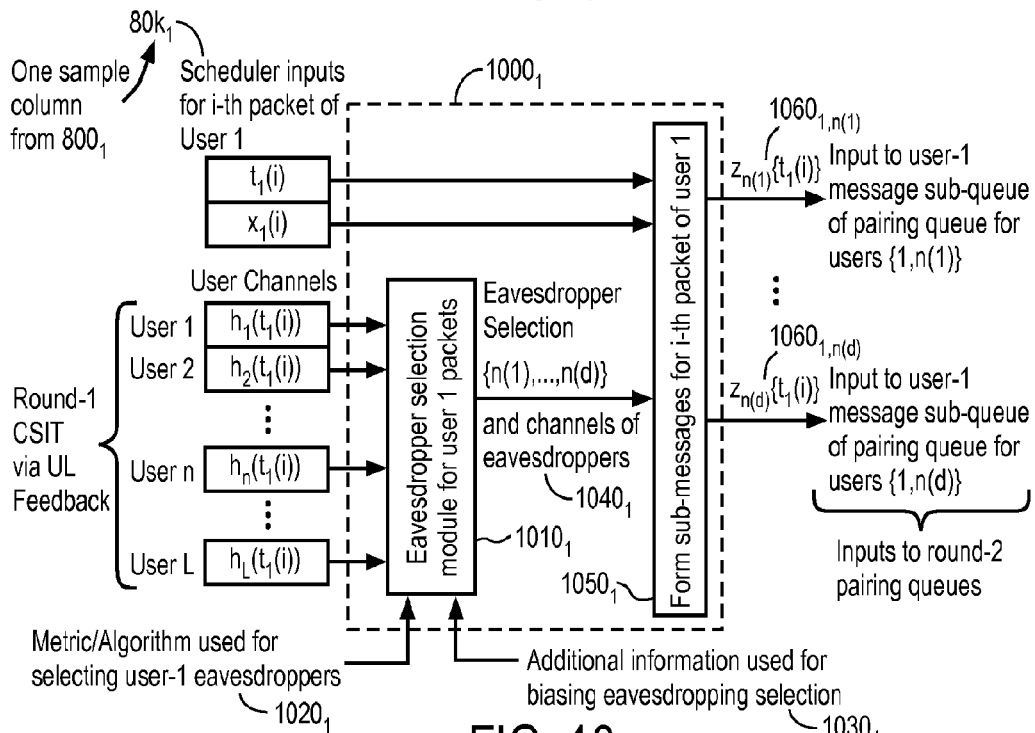
FIG. 10 illustrates a Round-2 scheduler operation with packet-centric MU-MIMO based on outdated CSI (CSIT from round 1).

The general round-2 scheduler operation on the packets of user 1 is shown in FIG. 10 and is performed by the scheduling module $1000_1$ (there are L such modules, $1000_1, 1000_2, \ldots, 1000_L$, one per user). Module $1000_1$ schedules eavesdroppers for packets intended for user 1 and reconstructs and outputs the associated eavesdropped messages, which are inputs to modules of the form 11001,q for some q>1 shown in FIG. 11. More specifically, given as input a column of 8001, corresponding to a single packet of user 1 with index i (this is assuming that packet i of user 1 has already undergone round-1 transmission, and channel feedback has been collected at the transmitter in one of the columns of 8001), the scheduler module $1010_1$ selects a subset (of size "d") of eavesdropped channels for pairing. The size d could be equal to 2 (to enable maximum DoFs in this K=3 user case) or greater than 2 (to enable diversity at the cost of DoFs). The value of d can change with user and packet index. Module $1050_1$ then generates the d eavesdropped messages of the i-th packet of user 1 (in a manner similar to module 950 in FIG. 9), as its outputs. The output $1060_{1,n(k)}$ of module $1050_1$ in FIG. 10 denotes the observation that eavesdropper n(k) obtained during the round-1 transmission of the i-th packet of user 1. It is an input to the round-2 pairing queue (1, n(k)) described in FIG. 11.

FIG. 11 depicts an embodiment of the round-2 pairing queue for users m and n with m<n. There are L(L-1)/2 such queues, one per user-pair. The queue in FIG. 11 takes as inputs: 1) the output $1060_{m,n}$ produced by module $1000_m$, corresponding to eavesdropped messages at receiver n of round-1 messages intended for user m, which is an input to module $1110_{m,n}$ (buffering operation); 2) the output $1060_{n,m}$ produced by module $1000_n$, corresponding to eavesdropped messages at receiver m of round-1 messages intended for user n, which is an input to module $1120_{m,n}$ (buffering operation). Each of the buffered items may be placed at the end of the buffer (first-in first-out operation), or other criteria may be used to move the item closer to the front of the buffer. Module $1130_{m,n}$ combines (at most) one sub-message from each of the two sub-queues, outputs the result in an output queue of paired messages $1140_{m,n}$ and discards (none, one, or preferably, both of) the messages that were combined. Note that when only one sub-queue has elements, in one embodiment module $1130_{m,n}$ does not perform any combining. In another embodiment, other user-packet information is provided to the module such as e.g., delay-tolerance constraints, and these are used to determine whether or not to delay combining or to combine the message with the "null" sub-message (i.e., simply relay the sub-message to the output queue). The paired messages are kept in the queue in module $1140_{m,n}$ waiting for an opportunity for a round-2 transmission. At any scheduling cycle, the scheduler can choose to transmit one of the paired packets from the output queues of one of the (L(L-1)/2) pairing queues based on a variety of criteria, including delay or QoS indicators, etc.

In case there are no paired packets in the round-2 pairing queues, in one embodiment, the scheduler proceeds with round one transmissions. In one embodiment, the scheduler proceeds with pairing a packet i of some user m in one of the paired queues, e.g., paired queue (m, n), with the zero packet, thereby constructing a paired packet of the i-th packet for user m with a "null" packet for user n and transmits it. There are many variations of these embodiments which may include only a subset of the (L(L-1)/2) pairing queues, where each user is only considered for pairing with a subset of the other users, and schemes that bias the round-one and round-two transmissions such that they induce unequal activity fractions (and QoS) among users. The abstraction of pairing a packet with eavesdroppers and storing it in the pertinent queue for pairing allows indeed enormous flexibility in scheduling.

In one embodiment having a less delay-tolerant implementation, more than 2 eavesdroppers are chosen for pairing. For instance, 4 eavesdroppers may be selected, and thus the packet may be placed in 4 queues. Once the first packet is paired and served, in one embodiment, none, one, or two, of the remaining packets may be flushed out of the remaining round-2 paired queues. Once a second eavesdropped version is paired, then the remaining ones can be flushed out.

The 3-user 2-round packet-centric MU-MIMO/scheduling scheme based on outdated CSI can be readily extended for K>3 (and R=2 rounds. In this case, the i-th packet of user m is a K-dimensional symbol (sequence) paired with K-1 eavesdroppers, n1, n2, . . . , $n_{K-1}$ that yield, e.g., the best K independent looks of the i-th packet at user m (thereby the i-th packet yields inputs to the K-1 paired queues: (m, $n_k$), for k=1, 2, . . . , K-1). After a single round one transmission, and the associated K-1 paired round-2 transmission, a K-dimensional symbol is delivered to user m over 1+(K-1)/2 slots (dividing K-1 by 2 signifies that these slots are simultaneously used for two users at a time), yielding DoFs=2K/(K+1), i.e., the same DoFs as a K-user 2-round MAT scheme. However, this packet centric scheme is more flexible in terms of scheduling as it does not suffer from the MAT session constraints that require each session to schedule K users such that each other's eavesdropped channels are simultaneously good for all K users. This packet centric scheme is also described by the generic packet-scheduling operation in FIG. 10.

The flexibility of the packet-centric schemes with respect to the MAT-session schemes is illustrated in FIG. 12, by depicting sample scheduler outputs from a MAT-session based scheduler and a packet-centric based scheduler for the case of K=3 users and R=2 rounds. In both examples, the 6th packet of user 1 has been paired with the 13th packet of user 2 and the 27th packet of user 3. Referring to FIG. 12, in the MAT-session scheduling scheme (top table), this packet is paired by the scheduler with packet 13 of user 2 and packet 27 of user 3 for a three-user two-round MAT scheme. The column with the heading "Packet j for user m" shows all the messages transmitted that carry (some message combination involving) message $x_m(j)$. Note that the round-two messages that carry information about packet 6 of user 1, completely determine all the other (round-2) entries in the table, including the depiction of the packets containing information regarding the 13th packet of user 2 and the 27th packet of user 3. The bottom table shows a typical output of the associated packet-centric scheduler, whereby packet 6 of user 1 was paired with 13 of user 2 and packet 27 of user 3. Note that, unlike the MAT-based approach, packet 13 of user 2 and packet 27 for user 3 need not be paired in the packet-centric scheme. As a result the packet-centric scheduler can pick other round-2 pairings for these packets (e.g., packet 13 of user 2 is paired with the packet 9 of some other user, with index e.g., 4).

Figure 13:
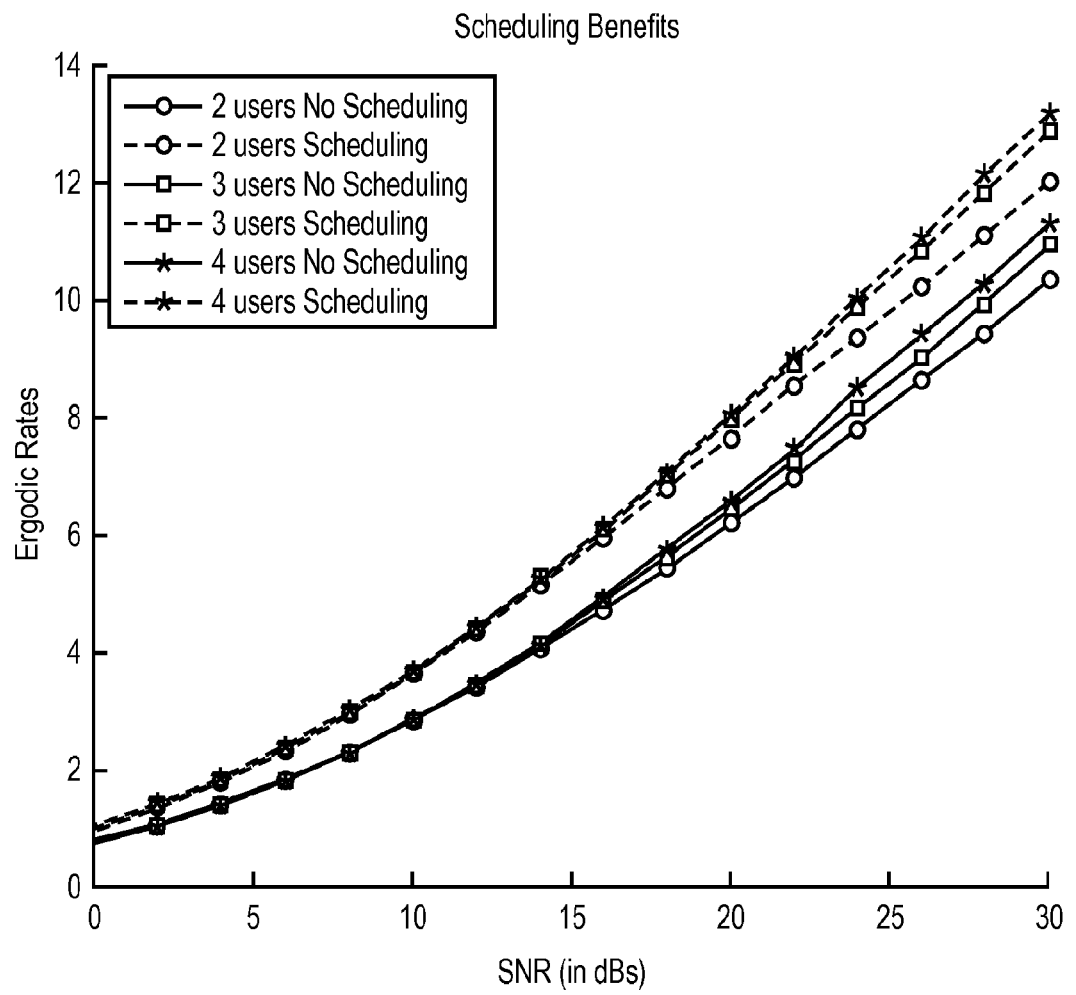
FIG. 13 illustrates scheduling benefits of two-round packet-centric scheduling schemes as a function of SNR.

FIG. 13 shows the scheduling benefits provided by such packet-centric two-round scheduling in the form of expected aggregate user rates as a function of SNR. In particular, the rate at a fixed SNR value provided by a curve in figure involving scheduling, corresponds to the aggregate rate provided by scheduler, assuming L=20 users, each with the given SNR value. That is, in the scheduler based curves (dashed), the packet-centric scheduler schedules transmissions among L=20 users, all having the same SNR.

Scheduling K-User R-Round Packet-Centric MU-MIMO Sessions Based on Outdated CSI

The K-user packet centric schemes with R=2 rounds can be readily extended to include schemes with R>2 rounds. Described herein are embodiments for the case K=3, R=3. Extensions to higher K and R are straightforward (although a bit more tedious to describe). Recall first the K=3, R=3 MAT scheme of FIG. 6 of the MAT paper, which sends 6 dimensional symbols to 3 users via a protocol that includes 6 round-1 transmissions (2 per user packet), 3 round-2 transmissions and 2, round 3 transmissions. From the packet-centric point of view, each user's 6 dimensional packet is involved in
1. 2 round-1 transmissions;
2. 2 round-2 transmissions; and
3. 2 round-3 transmissions.

The scheme results in delivering 6 scalar symbols to the user over (2+2/2+2/3) slots for DoFs=18/11 (i.e., the same as the 3-user 3-round MAT scheme). The round-1 and round-2 transmissions proceed as described above. The description of round-3 follows the same path as the description of round 2, except for a few differences. First, the role of the i-th packet of user m, i.e., $x_m(i)$, is taken by a "degree-two" message $x_{m,n}(i,j)$, corresponding to a paired packet from the output of the (m, n) round-2 paired queue, involving the i-th packet of user m and the j-th packet of user n. The pairing queue in round 3 forms and outputs triplets of packets for triplets of users (m, n, q). They enable transmissions that are simultaneously useful to all three-users (m, n, q), based on 3 "degree-2" (i.e., messages that are useful to two users simultaneously) messages $x_{m,n}(i,j)$, $x_{m,q}(i',l)$, and $x_{n,q}(j',l')$, as shown in FIG. 14. Referring to FIG. 14, scheduling with a 3-Round IA/MU-MIMO transmission based on outdated CSI using K (out of the possible $N_T$, with $3 \leq K \leq N_T$) transmitting antennas is set forth. The round-one i-th message for the m-th user, $x_m(i)$, is a K(K−1)×1 vector, while the round-2 messages, $x_{m,n}$, are (K−1)×1 vectors. The 1×K vector $h_m(t)$ denotes the channel coefficients between the K (active) transmit antennas and the receive antenna of user m at time t. A packet-centric scheduling scheme uses, per user packet, K−1 round-one slots, K−1 round-2 slots, and (K−1)(K−2) round-3 slots. It thus delivers one (K−1)K-dimensional message over 1+(K−1)/2+(K−1)(K−2)/3 slots, yielding DoFs=6K/(2K+5) scalar symbols per slot, i.e., the same DoFs as the 3-round K-user extension of the original MAT scheme in the MAT paper.

Figure 15:
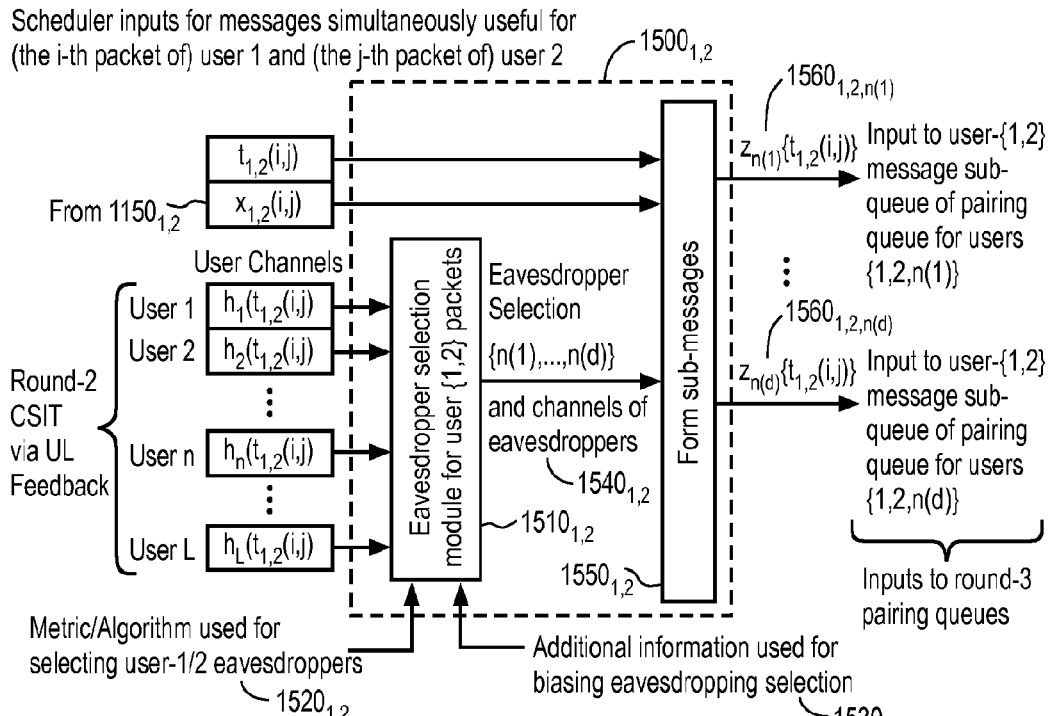
FIG. 15 illustrates a Round-3 scheduler operation with packet-centric PHY MU-MIMO based on outdated CSI (CSIT from round 2).

FIG. 15 illustrates round-3 scheduler operation with packet-centric PHY MU-MIMO based on outdated CSI (CSIT from round 2). Referring to FIG. 15, module $1500_{1,2}$ schedules eavesdroppers for messages that are simultaneously useful to users 1 and 2, i.e., messages of the form $x_{m,n}(i,j)$, that are the output of the (m, n) pairing queue module $1100_{m,n}$ shown in FIG. 11, with m=1 and n=2. The scheduler requires CSIT between the eavesdroppers considered for scheduling the packet to be available (in a buffer list that is a straightforward extension of the one shown for round-1 messages in FIG. 8). Module $1510_{1,2}$ then chooses the eavesdroppers for the message $x_{1,2}(i,j)$, in a manner similar to the manner module $1010_1$ in FIG. 10 chooses eavesdroppers for the message x1(i). Module $1550_{1,2}$ generates and outputs the associated eavesdropped sub-messages involving $x_{1,2}(i,j)$, in a manner similar to the manner module $1050_1$ in FIG. 10 generates and outputs the associated eavesdropped sub-messages involving $x_1(i)$.

Figure 16:
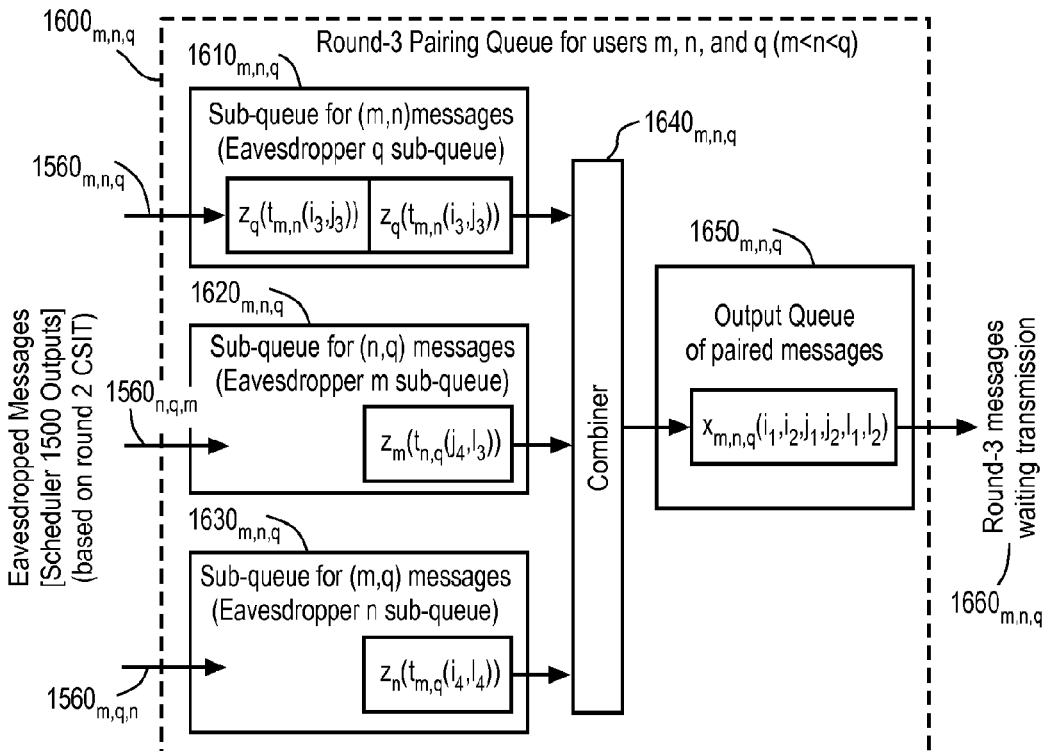
FIG. 16 illustrates a sample instance of a round-3 pairing queue for users m, n and q, with m<n<q.

To enable round-3 transmission the outputs of the modules $1500_{m,n}$ are directed to round-3 pairing queues involving users triples. FIG. 16 illustrates a sample instance of a round-3 pairing queue for users m, n and q, with m<n<q. Referring to FIG. 16, the pairing queue consists of three sub-queues, one per eavesdropping user. The top/middle/bottom sub-queue in FIG. 16 takes as input eavesdropped messages at user q/m/n of round-2 messages from the (m,n)/(n,q)/(m,q) round-2 pairing queue. The input messages are selected by the set of eavesdropping schedulers $1500_{m,n}$, $1500_{m,q}$, and $1500_{n,q}$, using CSI regarding the channels of user n and m and q (and possibly other users) at the time of round-1 transmissions of the associated round-2 packets. When all three sub-queues ($1610_{m,n,q}$, $1620_{m,n,q}$, $1630_{m,n,q}$) have elements waiting, a combiner module, $1640_{m,n,q}$, takes one entry from each queue at a time and combines them to form messages for round-3 transmission. These messages are then placed in an output queue (module $1650_{m,n,q}$) and wait to be scheduled for transmission.

Module $1600_{m,n,q}$ has three sub-queues with one input each, one for eavesdropper m, one for eavesdropper n, and one for eavesdropper q, as shown in FIG. 16. The generic round-3 packet-centric scheduler operation that generates inputs to these queues is shown in FIG. 15, for a generic message involving a packet of user 1 and a packet of user 2. As described above, the operation of module $1500_{1,2}$ shown in FIG. 15, which schedules eavesdropped sub-messages of round-2 messages simultaneously useful to users 1 and 2, follows along the same lines as that of module $1000_1$ shown in FIG. 10, which schedules eavesdropped sub-messages of round-1 messages useful to users 1. At any given time it operates on a buffer input list for messages simultaneously useful to users 1 and 2 and generates round-3 sub-messages of the form $1560_{1,2,s}$, for some eavesdropper s that is different from 1 and 2. In general, module $1500_{p,r}$ (with some p<r) generates sub-message outputs $1560_{p,r,s}$, for some s (different from p and r), which correspond to an eavesdropped observation of some user s of a round-2 message that is useful to both user p and user r (with p<r). The output $1560_{p,r,s}$ then becomes input to one of the sub-queues of the module $1600_{m,n,q}$ for some m, n, q, shown in FIG. 16. In particular, the following cases are distinguished:

1. s>r; $1560_{p,r,s}$ is the input to the top sub-queue of the module $1560_{m,n,q}$ in FIG. 16, and where m=p, n=r, and q=s;
2. s<p; $1560_{p,r,s}$ is the input to the middle sub-queue of the module $1560_{m,n,q}$ in FIG. 16, and where m=s, n=p, and q=r;
3. p<s<r; $1560_{p,r,s}$ is the input to the bottom sub-queue of the module $1560_{m,n,q}$ in FIG. 16, and where m=p, n=s, and q=r;

Combiner $1640_{m,n,q}$ takes at most one sub-message from each of its 3 input queues and combines them to generate round-3 messages (for round-3 transmission) that are simultaneously useful to all three users, m, n, and q. This is done in a manner similar to the manner based on which combiner $1130_{m,n}$ takes at most one sub-message from each of its two input queues to generate round-2 messages that are simultaneously useful to both user m and user n. In one embodiment, combiner $1640_{m,n,q}$ takes exactly one sub-message from each of its 3 input queues to generate a round-3 message.

Notice that round-3 messages awaiting for transmission in the output queue in Module $1650_{m,n,q}$ contain messages of the form $x_{m,n,q}(i,i',j,j',l,l')$, i.e., the contain information for decoding packets i and i' at user m, packets j and j' at user n, and packets l and l' at user q. Unlike the 3-round MAT session based scheme, this packet centric MU-MIMO scheme does not require
i and i' to be the same;
j and j' to be the same; and
l and l' to be the same.

This is clearly illustrated in FIG. 17, which shows sample scheduler outputs from a MAT-session based scheduler and a packet-centric based scheduler, for the case of K=3 users, and R=3 rounds. Referring to FIG. 17, the qualitative comparison between MAT-session and packet-centric scheduling for the case K=3 and R=3 is based on an example involving a given packet of user 1, in this case packet 6. In the MAT-session scheduling scheme (top table), this packet is paired by the scheduler with packet 13 of user 2 and packet 27 of user 3 for a three-user three-round MAT scheme. The bottom table shows a typical example of the output of an associated packet-centric scheduler, whereby packet 6 of user 1 was also paired with 13 of user 2 and packet 27 of user 3 in round 2. Note that, unlike the MAT-based approach, packet 6 of user 1 is considered in two groups of round-3 two-transmission cycles. In each of these two-round transmissions, user 1 gets useful equation for decoding $x_1(6)$ and one more for decoding some other symbol useful to user 1 ($x_1(10)$, and $x_1(3)$, respectively). Thus, comparison of the two sample scheduling outputs, readily reveals the flexibility provided to the scheduler by the packet-centric scheme, and is in sharp contrast to the MAT-session based scheme.

In one embodiment, the 3-way degree-two message-pairing for round-3 transmission can be decided based on the eavesdropped channels in the second round (this is not possible in the MAT based scheme). That is, for any $x_{p,r}(i,j)$ message, the remaining index in the pairing, 's', is chosen by module $1510_{p,r}$, as, e.g., the one with the highest eavesdropped channel quality (in terms of expected capacity) among all eavesdroppers. Then the corresponding measurement $z_s(t_{p,r}(i,j))$ is placed in the corresponding sub-queue of the (m, n, q) pairing queue, where (m, n, q) are the triplet of (p, r, s) reordered so that the indices appear in increasing order. Once all three sub-queues $1610_{m,n,q}$, $1620_{m,n,q}$, $1630_{m,n,q}$, in a module of the form $1600_{m,n,q}$ have a measurement, a round-3 message is formed by module $1640_{m,n,q}$. It is then placed in the queue (in module $1650_{m,n,q}$), and waits for round-3 transmission (see FIG. 16).

Embodiments involving 3-round and K>3 users are straightforward extensions of the K=3 user embodiments, and are shown in FIG. 14. They use K transmit antennas and involve forming messages, $x_m(i)$, that are K(K−1)×1 vectors, each consisting of K(K−1) scalar (coded) symbols for user m. This vector can be viewed as a concatenation of K−1 vectors, $x_m(i,k)$, for k=1, 2, . . . , K−1, each of dimension K. In one embodiment of the first round in FIG. 14, the K−1 transmissions used to transmit $x_m(i)$, amount to transmitting $x_m(i,k)$ in the k-th transmission. In one embodiment, all round-1 transmissions pertaining to the message are completed over the same channel, i.e., $t_m(i,k)$ (denoting the block of time-frequency slots where the channel is constant), is the same for all k (and fixed user index, m, and user packet, i). In one embodiment, the K−1 round-2 transmissions, containing degree-two messages based on eavesdropped measurements of $x_m(i)$, occur over distinct channels, i.e., $t_{m,n}(i,j) \neq t_{m,n}(i,j')$ (denoting the transmission blocks for any two out of the K−1 distinct pairings).

Examples of Embodiments

FIG. 18 illustrates an apparatus for use in a multi-user (MU)-MIMO wireless communication system having L single antenna user terminals. Referring to FIG. 18 the apparatus comprises a plurality of antennas 1801 coupled to a transceiver 1802. Transceiver 1802 has a transmitter 1814 coupled to antennas 1801 to form MAT sessions using outdated channel state information at the transmitter (CSIT).

Transceiver 1802 further includes a memory 1810 to store a first packet destined for a first user terminal and a second packet destined for a second user terminal and a scheduler 1811, coupled to memory 1810, to schedule a pair of user packets for a round-2 transmission to form one MAT session using outdated channel state information at the transmitter (CSIT) based on knowledge of user channels from transmissions to some or all L user terminals into and based on a utility function. The pair of user packets includes the first and second packets. Transceiver 1802 also includes processing logic 1813, coupled to scheduler 1811, to combine eavesdropped observations from two of the plurality of round-1 transmissions, where the eavesdropped observations include information indicative of round-1 eavesdropped channels feedback from the first and second user terminals. Transmitter 1814 transmits the combined observations of the pair of user packets as part of the round-2 transmission.

Note that in one embodiment, memory 1810 includes the buffers and memory described above to store packets for transmission and the observations obtained from previous transmissions. Memory 1810 may be external to transceiver 1802.

In one embodiment, scheduler 1811 schedules the round-2 transmission between the first packet and the second packet accompanied by two new round-1 transmissions for a third packet destined for the first user terminal and a fourth packet destined for the second user terminal.

In one embodiment, the utility function is based on a predicted sum rate.

Figure 19:
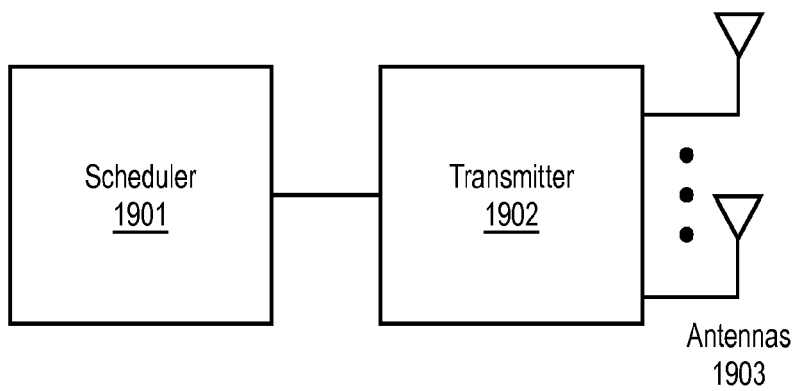
FIG. 19 is a block diagram of another embodiment of an apparatus for transmitting information in a multi-user (MU)-MIMO wireless communication system

FIG. 19 illustrates an apparatus for transmitting information in a multi-user (MU)-MIMO wireless communication system having L user terminals as part of multi-round multi-user MIMO sessions using outdated channel state information (CSI), where the sessions have multiple round-1 transmissions using different channels on different slots and at least one round-2 transmission. Referring to FIG. 19, the apparatus comprises a scheduler 1901 to schedule a round-r transmission slot during which a degree-r message is to be transmitted, where the degree-r message is a linear combination of r eavesdropped round-(r−1) messages intended for a set of r users, each of the r eavesdropped round-(r−1) messages constituting a message eavesdropped by a different user in the set of r users and intended for the remaining r−1 users, such that the degree-r message being simultaneously useful to r users. Scheduler 1901 independently selects each of the r eavesdropped round-(r−1) messages as being one of the best eavesdropped observations of each said round-(r−1) message based on a utility function.

In one embodiment, scheduler 1901 selects the one eavesdropper message from the set of messages based on yielding the highest utility. In one embodiment, the utility function is based on an expected capacity increase for the group of user terminals associated with the one message selected from the set of messages. In one embodiment, the utility increment is based on a utility metric related to an incremental sum-rate or a weighted sum of user-rate increments.

In one embodiment, scheduler 1901, in scheduling eavesdroppers for a round-(r−1) transmission of a packet that intended for a set of r−1 user terminals, jointly chooses as eavesdroppers at least two user terminals not part of the set of (r−1) user terminals, and where each selected eavesdropper observation is used independently of the others, in the formation of a degree-r message, intended for the set of r users, the set comprising the union of original set of (r−1) users and the eavesdropper. In one embodiment, scheduler 1901 chooses based on one or more of a quality of each eavesdropped channel estimate and a maximum allowed delay for round-r transmission before discarding the packet.

In one embodiment, scheduler 1901 is coupled to, or includes, the buffers and memory described above to store packets for transmission and the observations obtained from previous transmissions.

The apparatus also includes a transmitter 1902, coupled to scheduler 1901, to transmit messages from the set of messages created by scheduler 1901 using a plurality of antennas 1903.

In one embodiment, the apparatus further comprises a plurality of user buffers 1904 coupled to scheduler 1901, where each of the plurality of user buffers 1904 stores packets for a distinct group of r user terminals with information for generating degree-r messages. In one embodiment, each buffer of user buffers 1904 contains one or more observations of one or more transmissions for a subset of (r−1) of the set of r user terminals, each observation corresponding to channels eavesdropped by the other user terminal in the set of r user terminals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for transmitting information in a multi-user (MU)-MIMO wireless communication system having a multi-antenna transmitter and L user terminals, the method comprising:
   scheduling a trio of user packets for a round-2 transmission to form one transmission session using outdated channel state information at the transmitter (CSIT), the trio of user packets including a first packet destined for a first user terminal of the L user terminals, a second packet destined for a second user terminal of the L user terminals, and a third packet destined for a third terminal of the L user terminals, based on knowledge of user channels from transmissions to some or all L user terminals and based on a utility function;
   combining eavesdropped observations from three of a plurality of round-1 transmissions, the eavesdropped observations including information indicative of round-1 eavesdropped channels fed back from the first, second and third user terminals; and
   transmitting the combined observations of the trio of user packets as part of the round-2 transmission,
   wherein a first message and a second message of the round-2 transmission include the first packet and the second packet, a third message and a fourth message of the round-2 transmission include the first packet and the third packet, a fifth message of the round-2 transmission includes the second packet and a fourth packet destined for a fourth user terminal of the L user terminals, and a sixth message of the round-2 transmission includes the third packet and a fifth packet destined for a fifth user terminal of the L user terminals.

2. The method defined in claim 1 wherein the utility function is based on a predicted sum or weighted sum rate.

3. An apparatus for use in a multi-user (MU)-MIMO wireless communication system having L single antenna user terminals, the apparatus comprising:
   a plurality of antennas; and
   a transceiver having a transmitter coupled to the antennas to form one or more transmission sessions using outdated channel state information at the transmitter (CSIT), wherein the transmitter further comprises
      a memory to store a first packet destined for a first user terminal of the L user terminals, a second packet destined for a second user terminal of the L user terminals and a third packet destined for a third user terminal of the L user terminals,
      a scheduler, coupled to the memory, to schedule a trio of user packets for a round-2 transmission to form a first transmission session using outdated channel state information at the transmitter (CSIT), the trio of user packets including the first, second and third packets, based on knowledge of user channels from transmissions to some or all L user terminals and based on a utility function,
      processing logic, coupled to the scheduler, to combine eavesdropped observations from three of a plurality of round-1 transmissions, the eavesdropped observations including information indicative of round-1 eavesdropped channels fed back from the first, second and third user terminals, and wherein the transmitter is operable to transmit the combined observations of the trio of user packets as part of the round-2 transmission,
   wherein a first message and a second message of the round-2 transmission include the first packet and the second packet, a third message and a fourth message of the round-2 transmission include the first packet and the third packet, a fifth message of the round-2 transmission includes the second packet and a fourth packet destined for a fourth user terminal of the L user terminals, and a sixth message of the round-2 transmission includes the third packet and a fifth packet destined for a fifth user terminal of the L user terminals.

4. The apparatus defined in claim 3 further wherein the utility function is based on a predicted sum rate.

5. An apparatus for transmitting information in a multi-user (MU)-MIMO wireless communication system having L user terminals as part of multi-round multi-user MIMO sessions using outdated channel state information (CSI), the sessions having a plurality of round-1 transmissions using different channels on different slots and at least one round-2 transmission, the apparatus comprising:
   a scheduler to schedule a round-r transmission slot during which a degree-r message is to be transmitted, wherein the degree-r message is a linear combination of r eavesdropped round-(r−1) messages intended for a set of r users, each of the r eavesdropped round-(r−1) messages constituting a message eavesdropped by a different user in the set of r users and intended for the remaining r−1 users, such that the degree-r message being simultaneously useful to r users, and further wherein the scheduler independently selects each of the r eavesdropped round-(r−1) messages based on a utility function; and a transmitter, coupled to the scheduler, to transmit messages from the set of messages created by the scheduler using a plurality of antennas, wherein a first message and a second message of the round-2 transmission include the first packet and the second packet, a third message and a fourth message of the round-2 transmission include the first packet and the third packet, a fifth message of the round-2 transmission includes the second packet and a fourth packet destined for a fourth user terminal of the L user terminals, and a sixth message of the round-2 transmission includes the third packet and a fifth packet destined for a fifth user terminal of the L user terminals.

6. The apparatus defined in claim 5 further comprising a plurality of user buffers coupled to the scheduler, each of the plurality of user buffers to store a plurality of packets for a distinct group of r user terminals with information for generating degree-r messages.

7. The apparatus defined in claim 6 wherein each buffer contains one or more observations of one or more transmissions for a subset of (r−1) of the set of r user terminals, each observation corresponding to channels eavesdropped by the other user terminal in the set of r user terminals.

8. The apparatus defined in claim 5 wherein the utility function is based on an expected capacity increase for the group of user terminals associated with a first message selected from the set of messages.

9. The apparatus defined in claim 5 wherein the scheduler selects the first eavesdropper message from the set of messages based on yielding a highest utility.

10. The apparatus defined in claim 9 wherein a utility increment is based on a utility metric related to an incremental sum-rate or a weighted sum of user-rate increments.

11. An apparatus for transmitting information in a multi-user (MU)-MIMO wireless communication system having L user terminals as part of multi-round MU-MIMO sessions using outdated channel state information (CSI), the sessions having a plurality of round-1 transmissions using different channels on different slots and at least one round-2 transmission, the apparatus comprising:

a scheduler to schedule a round-r transmission slot during which a degree-r message is to be transmitted, wherein the degree-r message is a linear combination of r eavesdropped round-(r−1) messages intended for a set of r users, each of the r eavesdropped round-(r−1) messages constituting a message eavesdropped by a different user in the set of r users and intended for the remaining r−1 users, such that the degree-r message being simultaneously useful to r users, and further wherein the scheduler independently selects each of the r eavesdropped round-(r−1) messages based on a utility function; and a transmitter, coupled to the scheduler, to transmit messages from the set of messages created by the scheduler using a plurality of antennas, wherein the scheduler, in scheduling eavesdropper terminals for a round-(r−1) transmission of a packet that intended for a set of r−1 user terminals, jointly chooses as eavesdropper terminals at least two user terminals not part of the set of (r−1) user terminals, and where each selected eavesdropper observation is used independently of the others, in the formation of a degree-r message, intended for the set of r users, the set comprising the union of original set of (r−1) users and the eavesdropper terminal, and the scheduler chooses based one or more of a quality of each eavesdropped channel estimate and a maximum allowed delay for round-r transmission before discarding the packet.

12. A method for transmitting information in a multi-user (MU)-MIMO wireless communication system having L user terminals as part of multi-round multi-user MIMO sessions using outdated channel state information (CSI), the sessions having a plurality of round-1 transmissions using different channels on different slots and at least one round-2 transmission, the method comprising:

scheduling a round-r transmission slot during which a degree-r message is to be transmitted, wherein the degree-r message is a linear combination of r eavesdropped round-(r−1) messages intended for a set of r users, each of the r eavesdropped round-(r−1) messages constituting a message eavesdropped by a different user in the set of r users and intended for the remaining r−1 users, such that the degree-r message being simultaneously useful to r users, and further including independently selecting each of the r eavesdropped round-(r−1) messages based on a utility function; and transmitting messages from the set of messages created by the scheduler using a plurality of antennas, wherein a first message and a second message of the round-2 transmission include the first packet and the second packet, a third message and a fourth message of the round-2 transmission include the first packet and the third packet, a fifth message of the round-2 transmission includes the second packet and a fourth packet destined for a fourth user terminal of the L user terminals, and a sixth message of the round-2 transmission includes the third packet and a fifth packet destined for a fifth user terminal of the L user terminals.

13. The method defined in claim 12 wherein the scheduler selects a first eavesdropper message from the set of messages based on yielding a highest utility.

14. The method defined in claim 13 wherein the utility function is based on a utility metric related to an incremental sum-rate or a weighted sum of user-rate increments.

15. A method for transmitting information in a multi-user (MU)-MIMO wireless communication system having an multi-antenna transmitter and a plurality of user terminals, the method comprising:

performing multi-round MU-MIMO sessions using outdated channel state information at the transmitter (CSIT), the MU-MIMO sessions having a plurality of round-1 transmissions using different channels on different slots and at least one round-2 transmission, including receiving information regarding channels for a plurality of user terminals, including a first user terminal;

scheduling one or more eavesdropper terminals for packets to be sent to the user terminal, including selecting eavesdropper terminals for the first user terminal based on CSIT of the round-1 transmissions;

forming eavesdropper sub-messages for a packet of the first user terminal, wherein the eavesdropper sub-messages include noise-free observations obtained at the plurality of user terminals;

inputting the eavesdropper sub-messages to sub-queues of a round-2 pairing queue for the first user terminal and a second user terminal;

combining sub-messages into round-2 messages; and transmitting one or more round-2 messages.

16. A method for transmitting information in a multi-user (MU)-MIMO wireless communication system having a multi-antenna transmitter and a plurality of user terminals, the method comprising:
- performing multi-round MU-MIMO sessions using outdated channel state information at the transmitter (CSIT), the MU-MIMO sessions having a plurality of round-1 transmissions using different channels on different slots and at least one round-2 transmission, including receiving information regarding channels for a plurality of user terminals, including a first user terminal;
- scheduling one or more eavesdropping terminals for packets to be sent to the first user terminal, including selecting eavesdroppers for the first user terminal based on CSIT of round-1 transmissions;
- forming eavesdropper sub-messages for a packet of the first user terminal; inputting the eavesdropper sub-messages to sub-queues of a round-2 pairing queue for the first user terminal and a second user terminal; combining sub-messages into round-2 messages; and
- transmitting one or more round-2 messages,
- wherein selecting eavesdroppers is based on information regarding eavesdropped channels for at least a subset of other user terminals during the round-1 transmission for the first user terminal and
- the information further comprises one or more of a quality of each eavesdropped channel estimate and a maximum allowed delay for round-2 transmission before discarding the packet.

* * * * *